United States Patent
Ogura

(10) Patent No.: US 10,609,258 B2
(45) Date of Patent: Mar. 31, 2020

(54) INKJET PRINTER

(71) Applicant: Roland DG Corporation, Hamamatsu-shi, Shizuoka (JP)

(72) Inventor: Yoshinari Ogura, Hamamatsu (JP)

(73) Assignee: ROLAND DG CORPORATION, Shizuoka (JP)

(*) Notice: Subject to any disclaimer, the term of this patent is extended or adjusted under 35 U.S.C. 154(b) by 0 days.

(21) Appl. No.: 15/959,380

(22) Filed: Apr. 23, 2018

(65) Prior Publication Data

US 2018/0316826 A1 Nov. 1, 2018

(30) Foreign Application Priority Data

May 1, 2017 (JP) ................................ 2017-091085

(51) Int. Cl.
- *H04N 1/54* (2006.01)
- *H04N 1/23* (2006.01)
- *B41J 29/38* (2006.01)
- *B41J 2/21* (2006.01)

(52) U.S. Cl.
CPC .............. *H04N 1/54* (2013.01); *B41J 2/2114* (2013.01); *B41J 29/38* (2013.01); *H04N 1/2369* (2013.01)

(58) Field of Classification Search
CPC ...................................................... B41J 2/117
See application file for complete search history.

(56) References Cited

U.S. PATENT DOCUMENTS

| | | | |
|---|---|---|---|
| 2006/0227194 A1 | 10/2006 | Hoshino | |
| 2007/0216920 A1 | 9/2007 | Watanabe | |
| 2008/0211866 A1* | 9/2008 | Hill | B41M 3/008 347/42 |
| 2009/0220695 A1 | 9/2009 | Oyanagi et al. | |
| 2009/0244605 A1* | 10/2009 | Yoshida | B41J 11/0015 358/1.15 |
| 2011/0102488 A1* | 5/2011 | Usuda | B41J 2/2114 347/14 |
| 2012/0188568 A1* | 7/2012 | Matsunaga | B41J 2/2117 358/1.9 |
| 2012/0200633 A1 | 8/2012 | Aoyama | |
| 2012/0262509 A1* | 10/2012 | Sakai | B41J 2/2117 347/6 |
| 2012/0287188 A1* | 11/2012 | Shimada | B41J 2/2117 347/12 |

(Continued)

FOREIGN PATENT DOCUMENTS

| | | | |
|---|---|---|---|
| JP | 2002-036517 A | 2/2002 | |
| JP | 2006-289722 A | 10/2006 | |

(Continued)

*Primary Examiner* — Julian D Huffman
(74) *Attorney, Agent, or Firm* — Keating & Bennett, LLP

(57) ABSTRACT

An inkjet printer includes a print controller and a print mode setter. The print controller causes one or a plurality of print layers to be printed on a recording medium. The one or the plurality of print layers may include one or both of a special color ink layer and a process color ink layer. The special color ink layer includes ink dots of a special color ink, and the process color ink layer includes ink dots of the process color ink. The print mode setter is programmed and/or configured to be able to set a multi-layer print mode in which three or more layers including both of the special color ink layer and the process color ink layer are printed.

13 Claims, 16 Drawing Sheets

(56) References Cited

U.S. PATENT DOCUMENTS

| | | | | |
|---|---|---|---|---|
| 2012/0287189 A1* | 11/2012 | Shimada | ............... | B41J 2/2117 347/12 |
| 2013/0222480 A1* | 8/2013 | Aoki | .................... | B41J 2/2117 347/40 |
| 2013/0278660 A1* | 10/2013 | Tsuji | .................... | B41J 2/2132 347/14 |
| 2013/0286069 A1* | 10/2013 | Aoyama | .................. | B41J 2/21 347/9 |
| 2014/0255645 A1* | 9/2014 | Shumaker | ............. | B05C 9/022 428/99 |
| 2014/0354726 A1* | 12/2014 | Heath | ................... | B41J 2/2117 347/15 |
| 2015/0191024 A1* | 7/2015 | Heath | ..................... | H04N 1/60 347/15 |
| 2016/0182764 A1* | 6/2016 | Akasaka | .............. | G06K 15/02 358/1.9 |
| 2018/0227461 A1* | 8/2018 | Atzmon | .................. | H04N 1/54 |
| 2018/0281446 A1* | 10/2018 | Kayanaka | ............ | G06K 15/105 |
| 2019/0080479 A1* | 3/2019 | Totsuka | .................... | B41J 2/01 |

FOREIGN PATENT DOCUMENTS

| | | | |
|---|---|---|---|
| JP | 2007-282205 | A | 10/2007 |
| JP | 2009-113284 | A | 5/2009 |
| JP | 2009-269397 | A | 11/2009 |
| JP | 2009-298044 | A | 12/2009 |
| JP | 2010-240934 | A | 10/2010 |
| JP | 2012-162002 | A | 8/2012 |
| JP | 2013-252640 | A | 12/2013 |
| JP | 2013-256045 | A | 12/2013 |

* cited by examiner

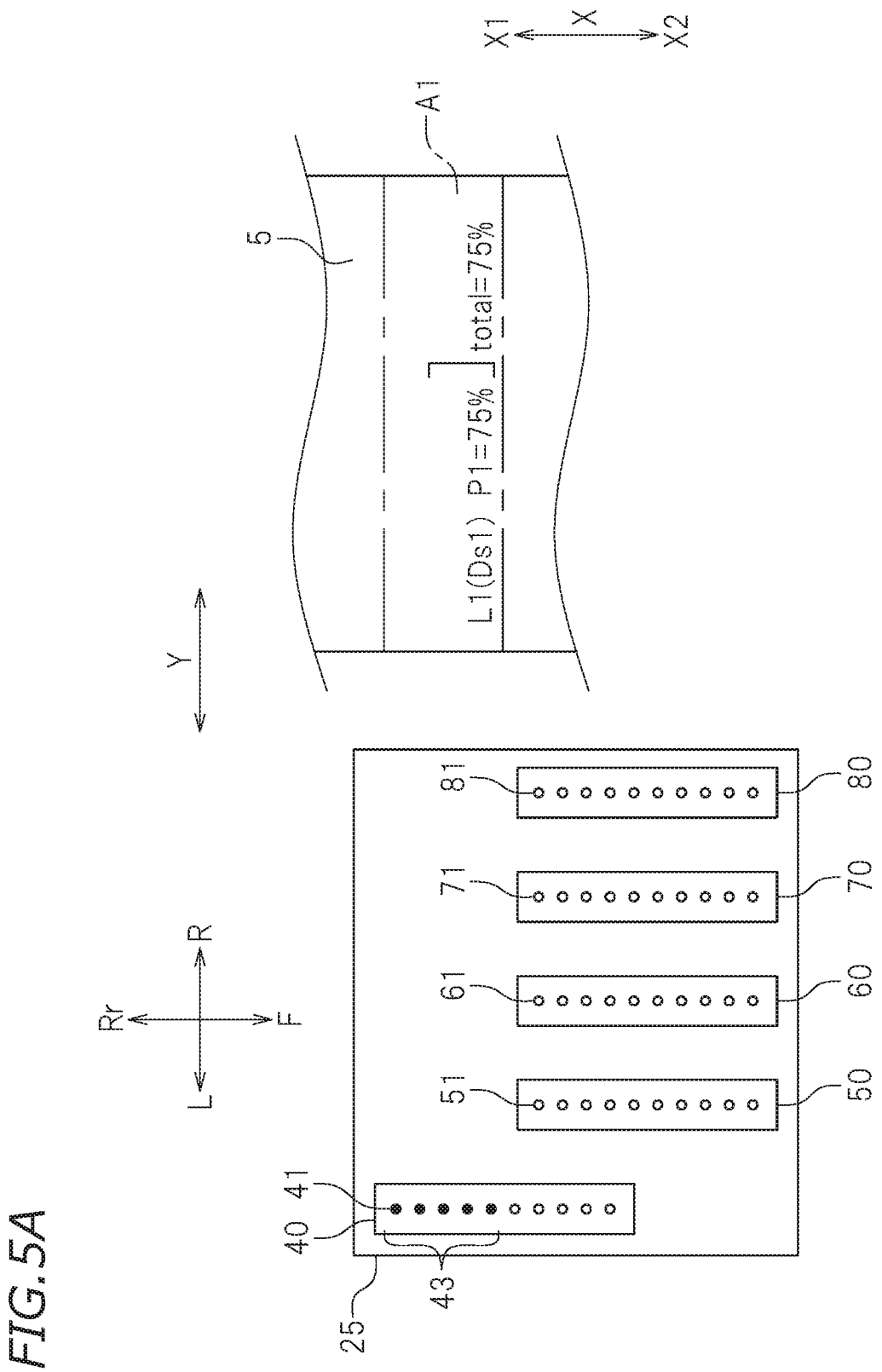

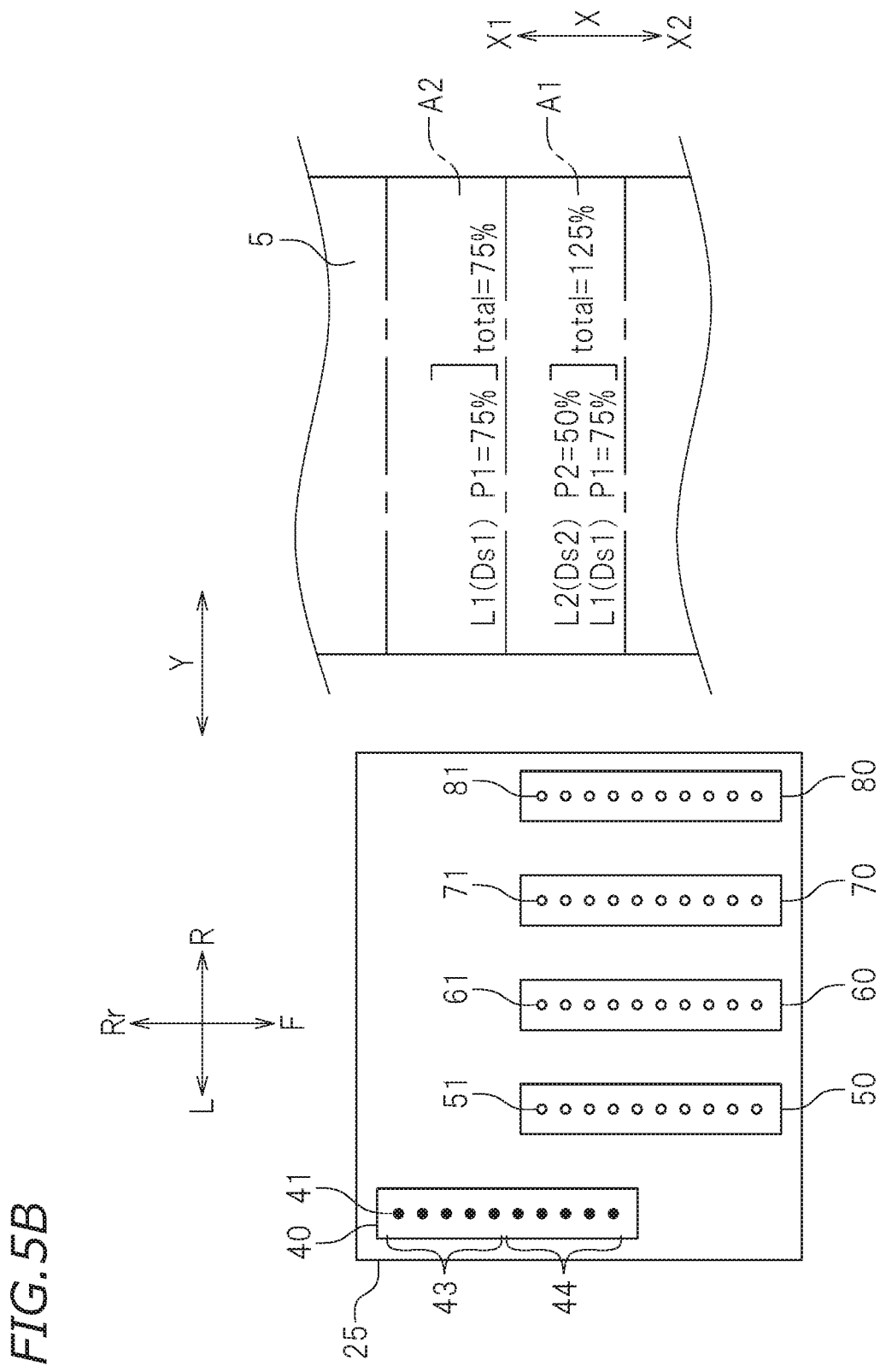

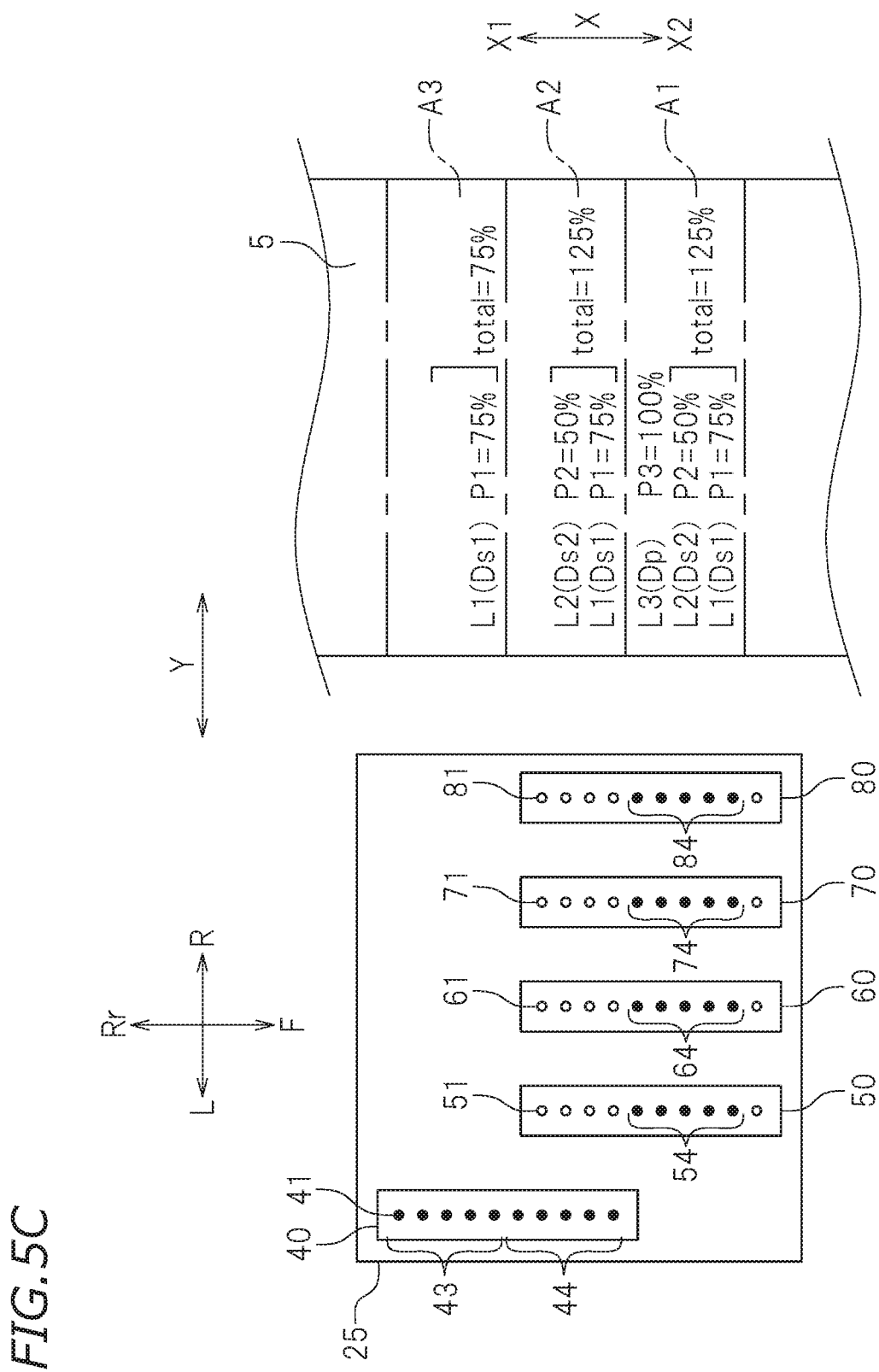

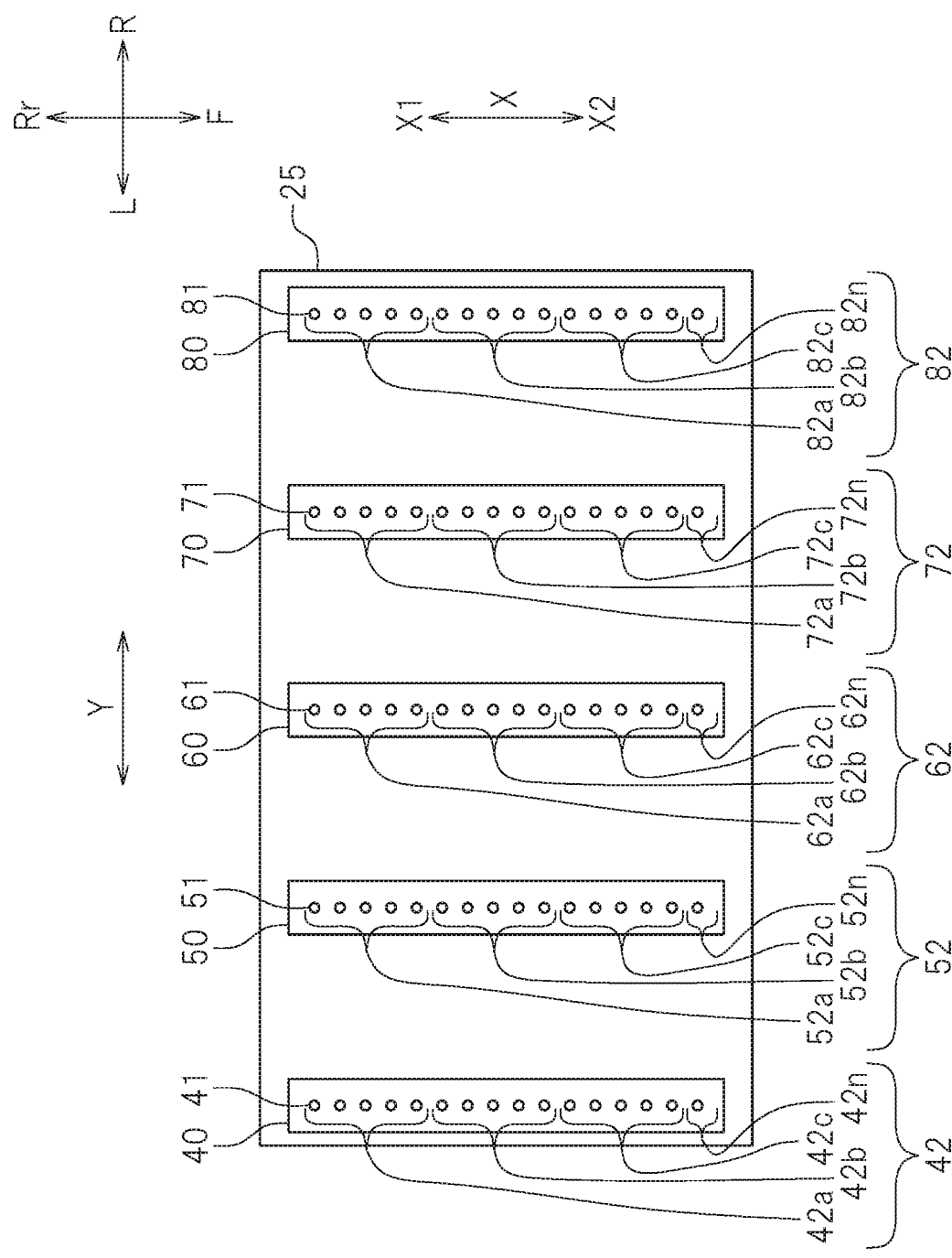

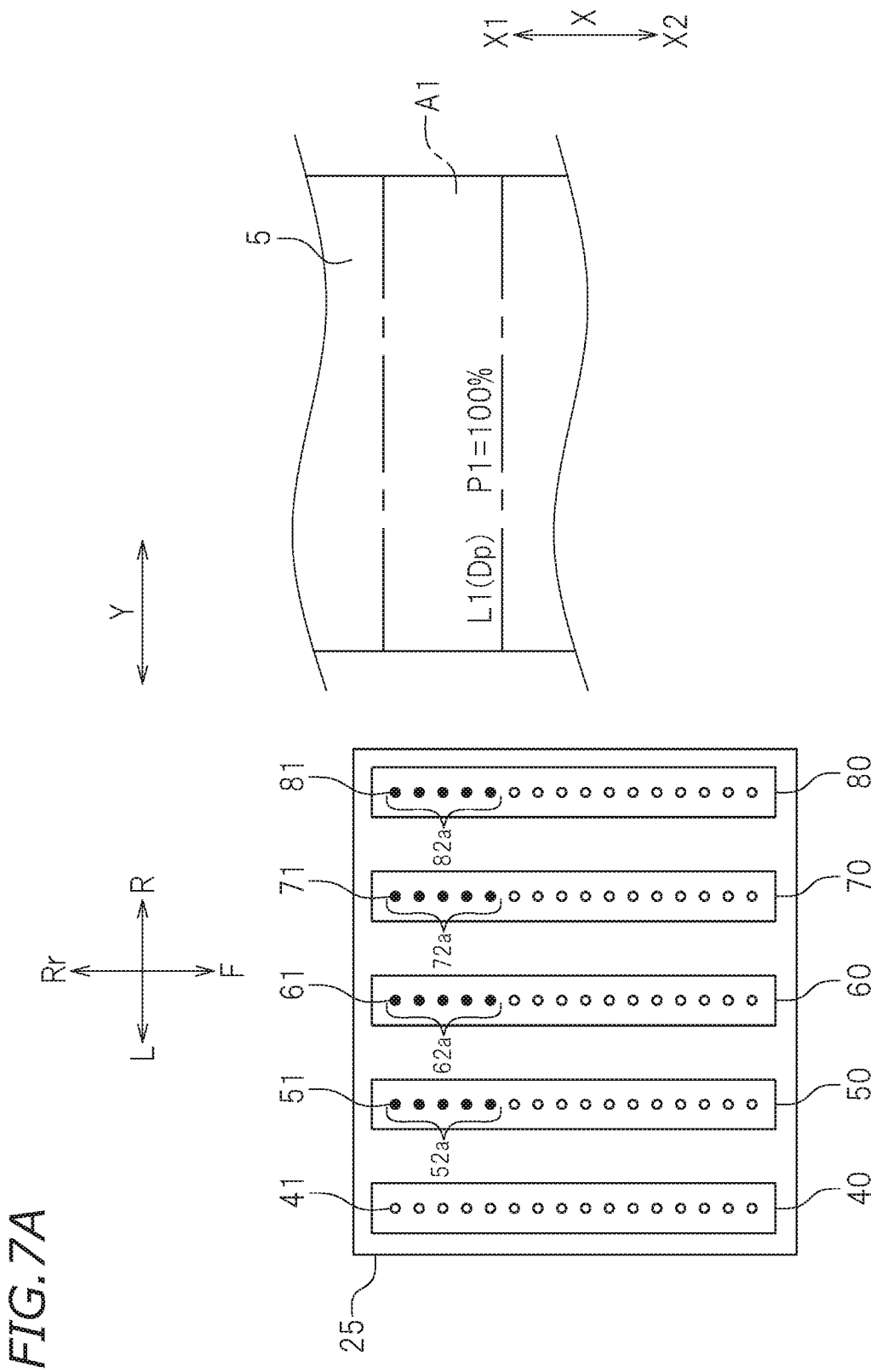

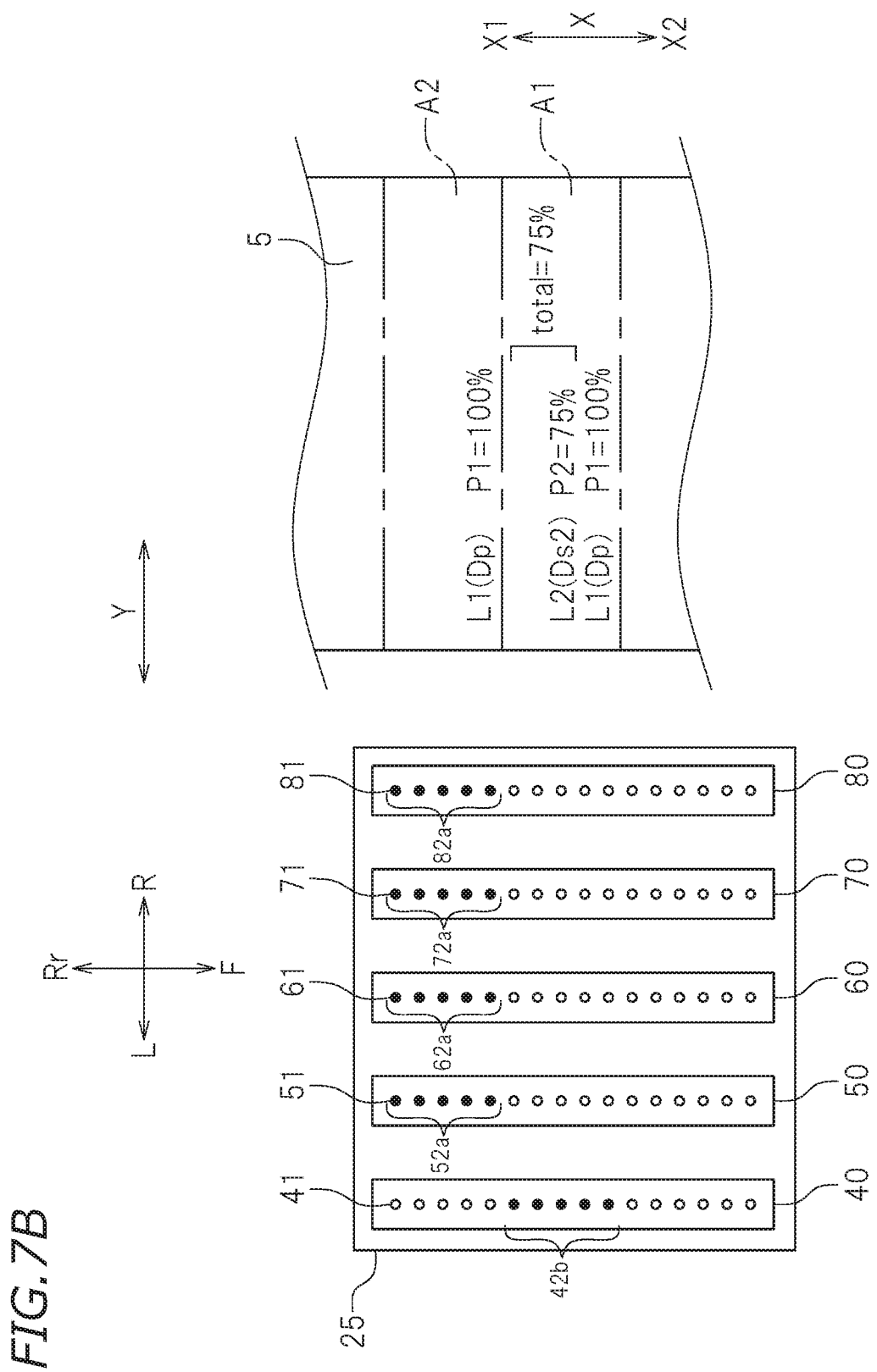

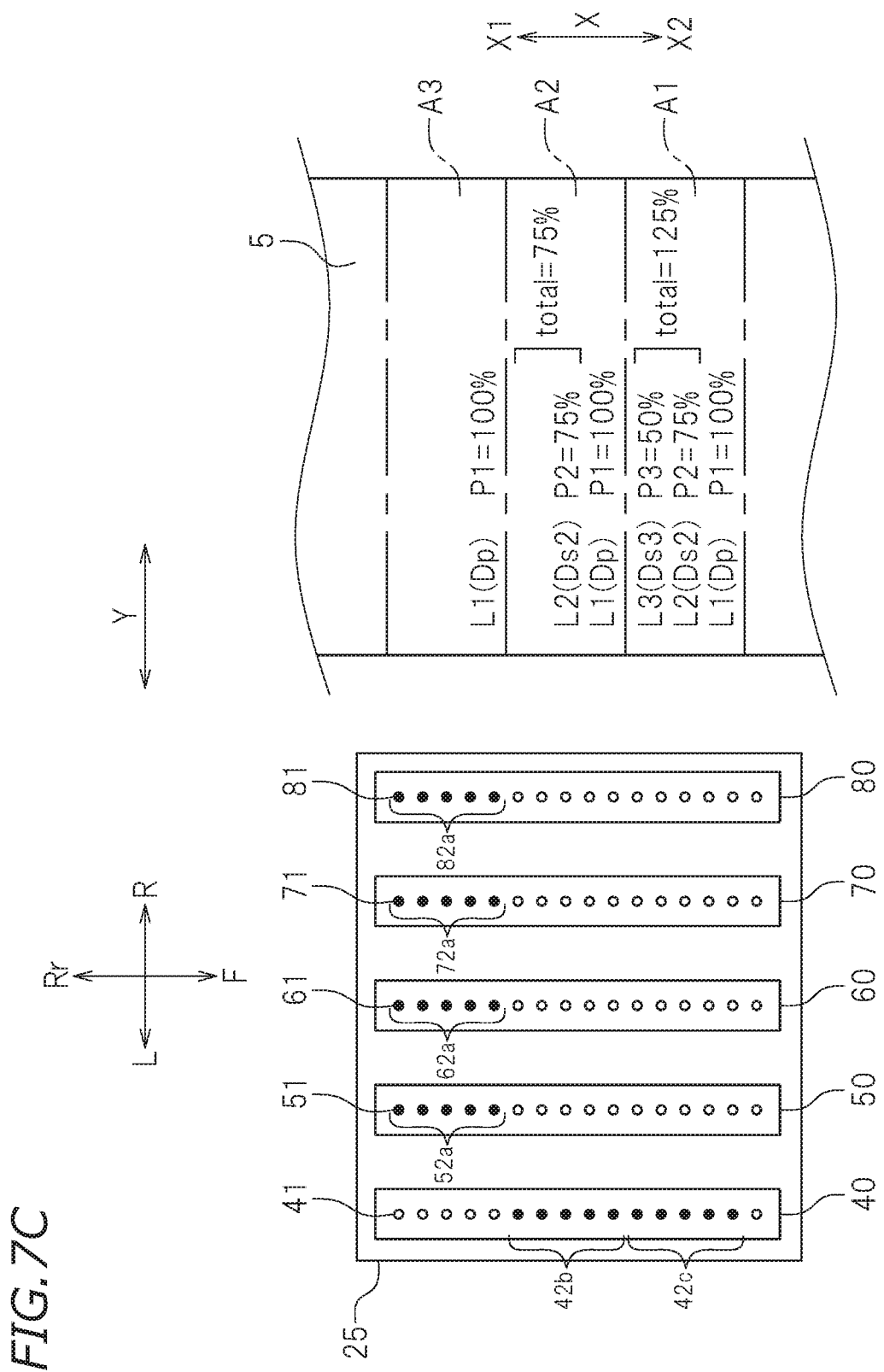

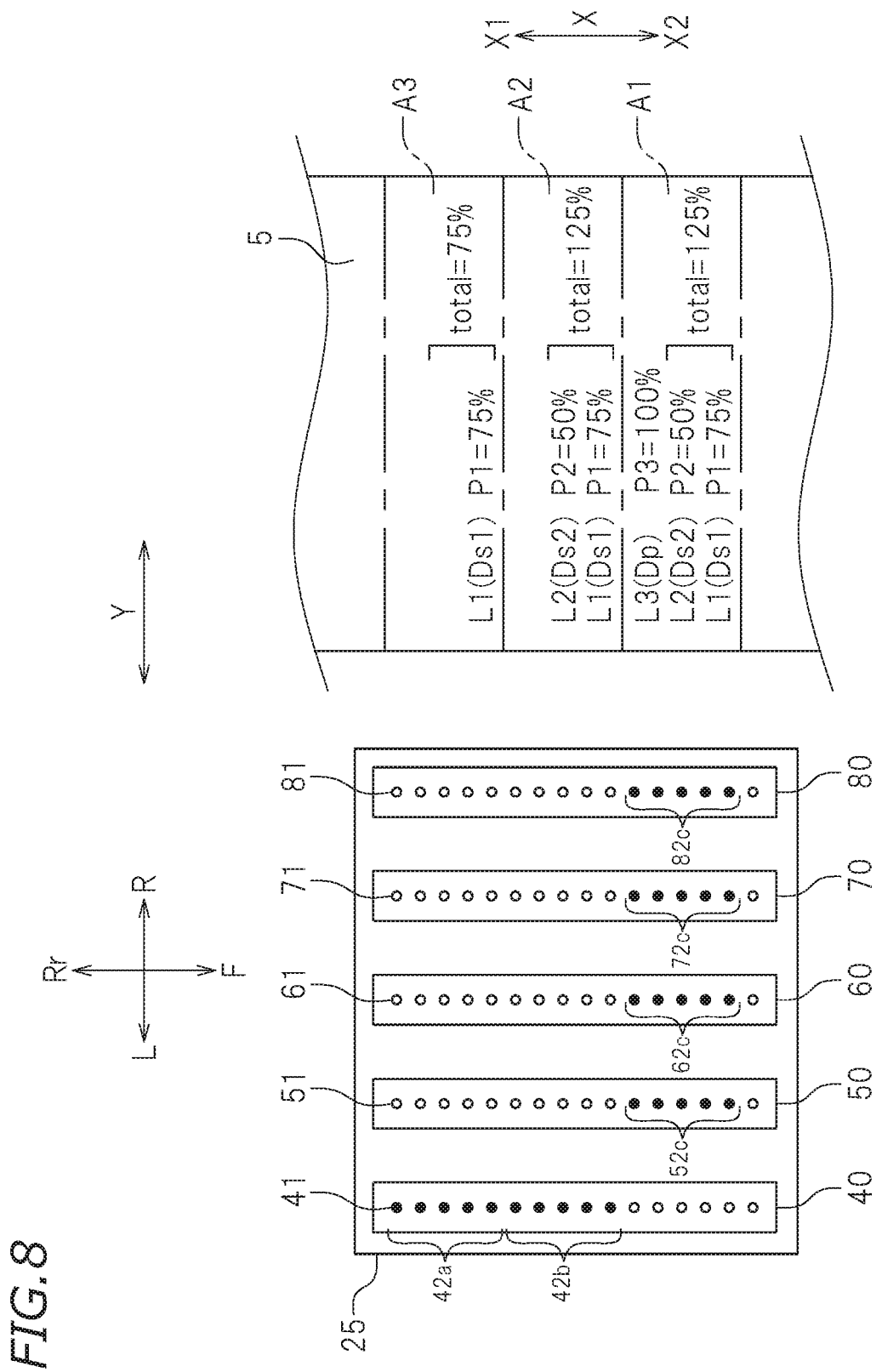

FIG.10
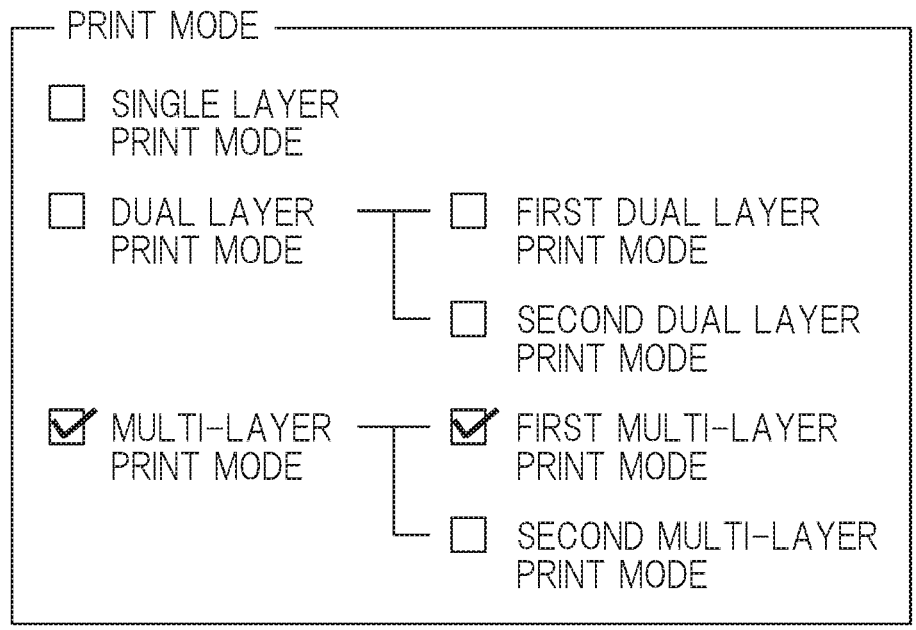
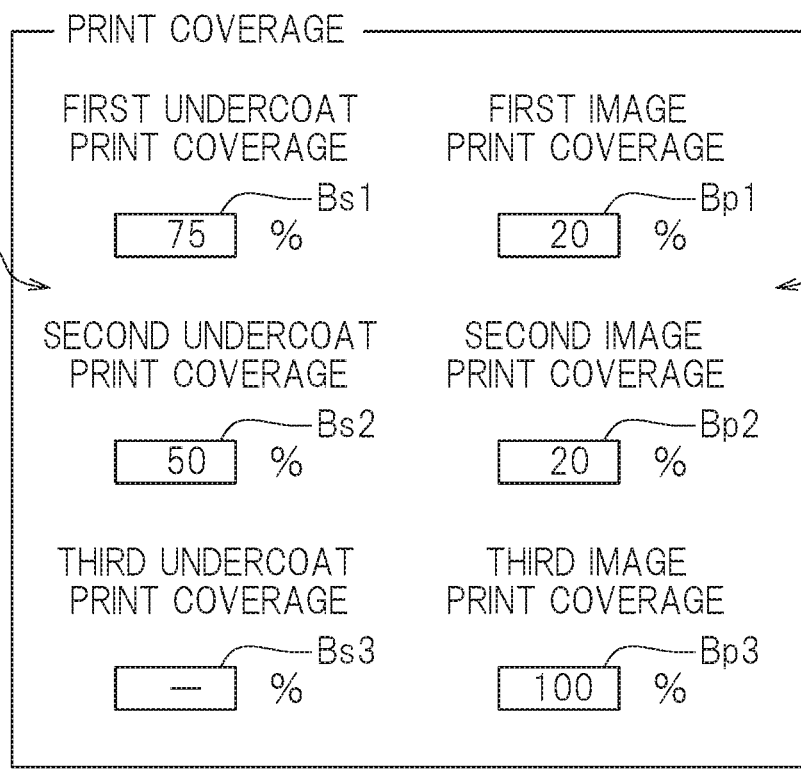

INKJET PRINTER

CROSS REFERENCE TO RELATED APPLICATIONS

This application claims the benefit of priority to Japanese Patent Application No. 2017-091085 filed on May 1, 2017. The entire contents of this application are hereby incorporated herein by reference.

BACKGROUND OF THE INVENTION

1. Field of the Invention

The present invention relates to inkjet printers.

2. Description of the Related Art

An overprinting technology is known in which a layer of a special color ink, such as white ink, is printed on a recording medium and an image is printed over the layer of the special color ink. For example, JP 2007-282205 A discloses a print data producing device provided with a conversion table that converts color information of image data into white ink levels, and an inkjet printer including the print data producing device. JP 2007-282205 A describes that an undercoat layer composed of white ink provides, for example, the function of hiding colors of a colored recording medium or the function of making colors in the produced image brighter.

The undercoat layer in overprinting imparts a certain visual effect on an image. When the recording medium is a transparent recording medium, for example, an undercoat layer is formed on the recording medium by a special color ink, such as white ink, so that the printed image appears clearly because of the light shielding effect of the undercoat layer. However, there are some instances where the required visual effect may not be obtained sufficiently due to the print resolution and other constraints of the inkjet printer. An example is an insufficient light shielding effect resulting from insufficient ink dot density of the special color ink. Another example is because a process color ink for forming the image and a special color ink for forming the undercoat layer exist in a mixed state on the recording medium, clearness of the image degrades.

SUMMARY OF THE INVENTION

Preferred embodiments of the present invention provide inkjet printers that achieve high-quality images using an overprinting technique.

An inkjet printer according to a preferred embodiment of the present invention includes a first ink head including first nozzles arrayed along a sub-scanning direction and ejecting a special color ink onto a recording medium, a second ink head including second nozzles arrayed along the sub-scanning direction and ejecting a process color ink onto the recording medium, and a controller configured or programmed to control the first ink head and the second ink head. The controller is configured or programmed to include a print controller and a print mode setter. The print controller is configured or programmed to control at least one of the first ink head and the second ink head to print one or a plurality of print layers on the recording medium, the one or the plurality of print layers including one or both of a special color ink layer and a process color ink layer. The special color ink layer is formed of ink dots including ink dots of the special color ink, and the process color ink layer is formed of ink dots including ink dots of the process color ink. The print mode setter sets a print mode and instructs the print controller to perform the print mode that has been set. The print mode setter is able to set, as the print mode, a multi-layer print mode in which three or more layers are printed, including both of the special color ink layer and the process color ink layer.

In an inkjet printer according to a preferred embodiment of the present invention, at least one of the special color ink layer and the process color ink layer includes two or more print layers. When the print mode is set such that the special color ink layer includes a plurality of print layers, it is possible to perform printing to obtain visual effects resulting from the special color ink more effectively. For example, when special color ink layers of white ink or other suitable ink are printed on a transparent sheet, the special color ink layers are provided with a more effective light shielding effect. On the other hand, when the print mode is set such that the process color ink layer includes a plurality of print layers, adverse effects of the special color ink layer on the printed image are reduced, such that a clearer image is obtained. For example, even when the special color ink is a white ink or other suitable ink and the known overprinting techniques may degrade clearness of the printed image due to the adverse effects of the special color ink, the inkjet printer described above is able to reduce the adverse effects of the special color ink on the printed image by overprinting two or more process color ink layers. When both of the special color ink layer and the process color ink layer include a plurality of layers, both of the advantageous effects described above are obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5A is a schematic view illustrating a region on a recording medium at a certain point in time in a multi-layer print mode.

FIG. 5B is a schematic view illustrating regions on the recording medium at a next pass subsequent to the point in time illustrated by FIG. 5A.

FIG. 5C is a schematic view illustrating regions on the recording medium at a next pass subsequent to the point in time illustrated by FIG. 5B.

FIG. 6 is a view illustrating the configuration of the bottom surface of a carriage according to a second preferred embodiment of the present invention.

FIG. 7A is a schematic view illustrating a region on a recording medium at a certain point in time in a second multi-layer print mode.

FIG. 7B is a schematic view illustrating regions on the recording medium at a next pass subsequent to the point in time illustrated by FIG. 7A.

FIG. 7C is a schematic view illustrating regions on the recording medium at a next pass subsequent to the point in time illustrated by FIG. 7B.

FIG. 8 is a schematic view illustrating a printing process in a first multi-layer print mode, showing a point in time corresponding to FIG. 7C.

FIG. 10 is a view illustrating an example of an operation panel screen according to the third preferred embodiment of the present invention.

DETAILED DESCRIPTION OF THE PREFERRED EMBODIMENTS

Figure 1:
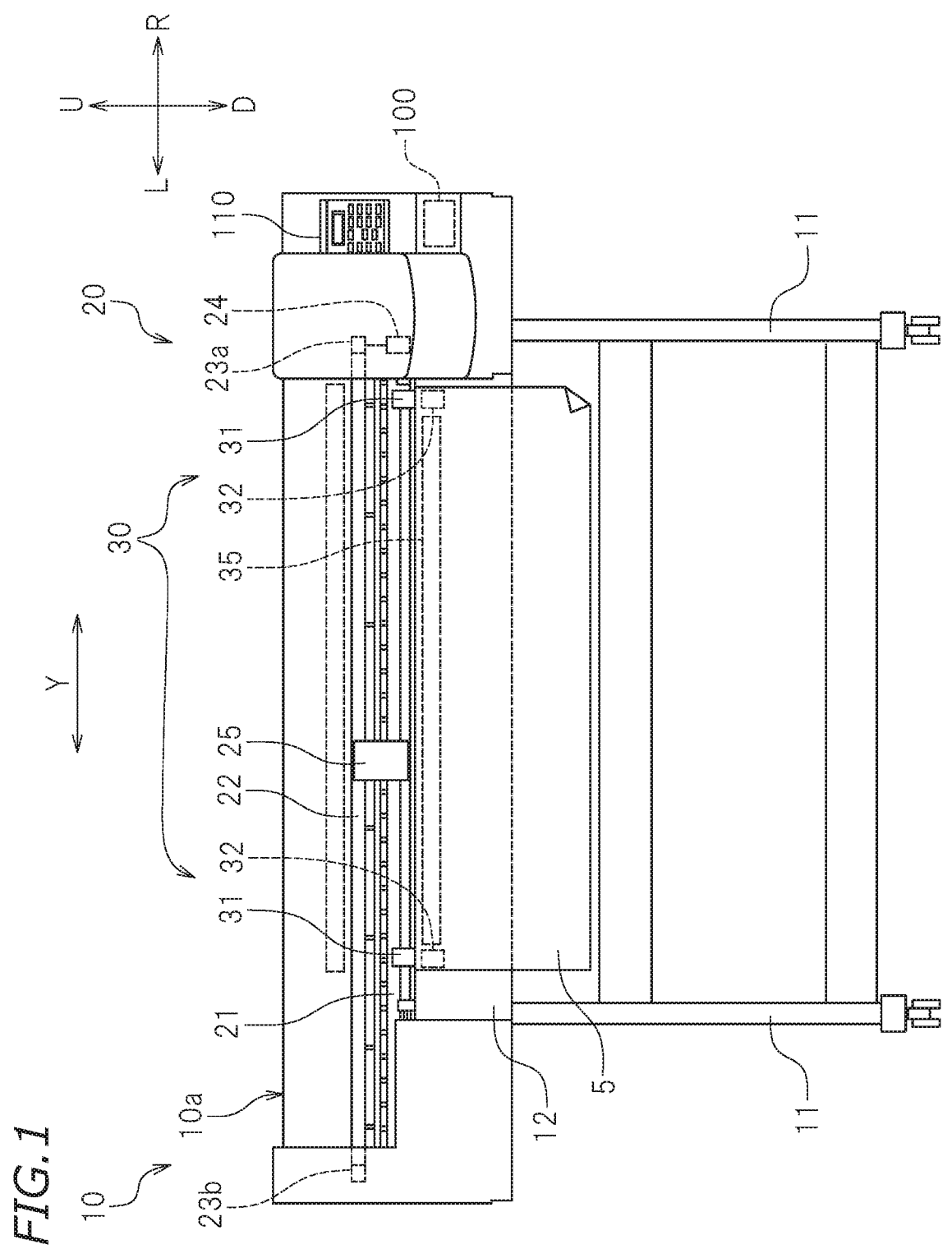
FIG. 1 is a front view illustrating an inkjet printer according to a first preferred embodiment of the present invention.

Hereinbelow, inkjet printers according to preferred embodiments of the present invention will be described with reference to the drawings. It should be noted, however, that the preferred embodiments described herein are, not intended to limit the present invention. The features and components that have the same effects are denoted by the same reference symbols, and repetitive description thereof may be omitted as appropriate. In the following description, with respect to the operator standing in front of the inkjet printer, a direction towards the operator relative to the inkjet printer is defined as "frontward", and a direction away from the inkjet printer relative to the operator is defined as "rearward". In the drawings, reference character Y represents the main scanning direction, and reference character X represents the sub-scanning direction X that is orthogonal or substantially orthogonal to the main scanning direction Y. Reference characters F, Rr, L, R, U, and D in the drawings represent front, rear, left, right, up, and down, respectively. These directional terms are, however, merely provided for convenience in the description, and are not intended to limit in any way the manner in which the inkjet printer should be configured or arranged.

First Preferred Embodiment

Figure 2:
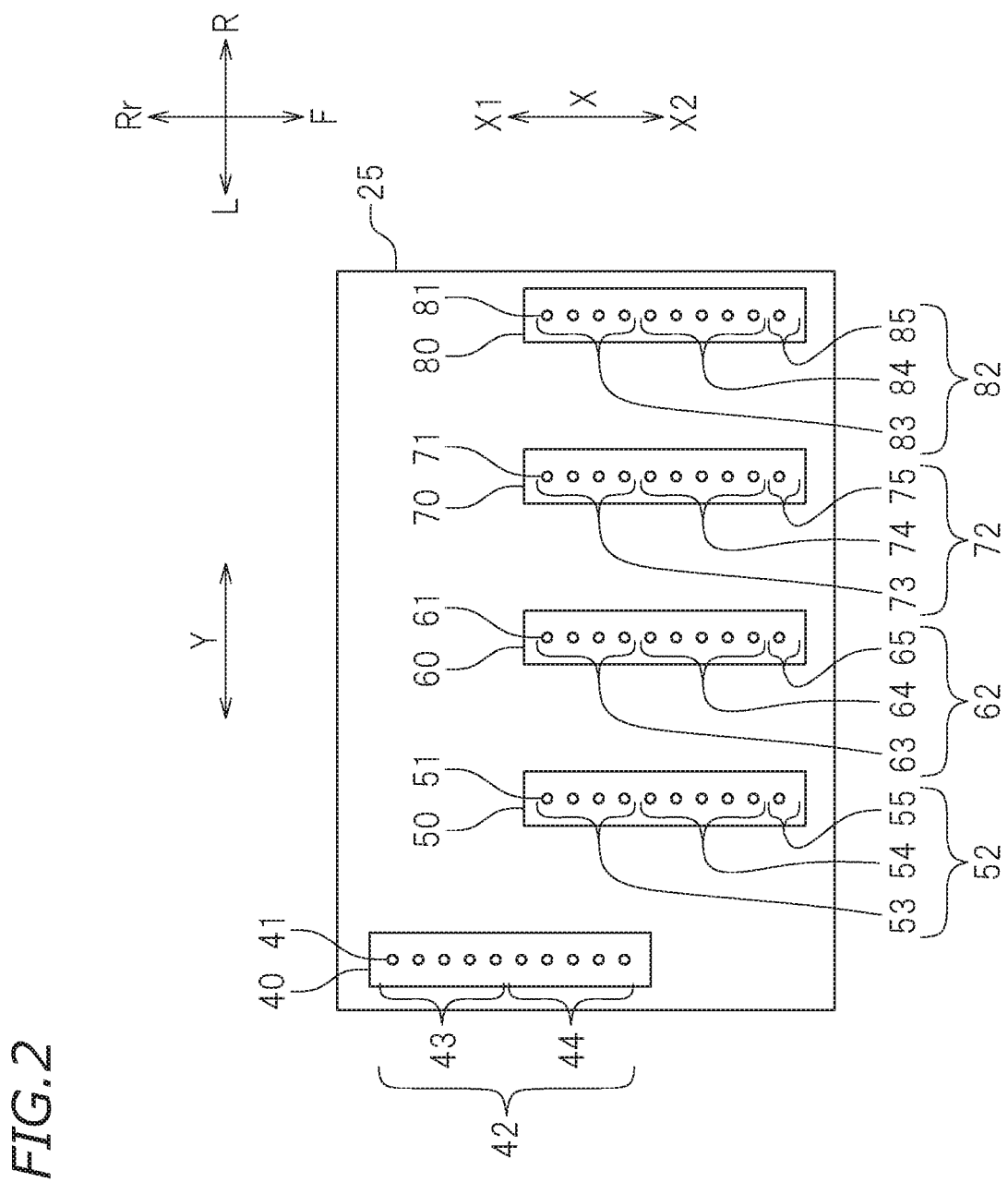
FIG. 2 is a view illustrating the configuration of the bottom surface of a carriage according to the first preferred embodiment of the present invention.

FIG. 1 is a front view of a large-format inkjet printer (hereinafter simply "printer") 10 according to a first preferred embodiment of the present invention. The printer 10 prints images on a recording medium 5 by consecutively transporting a rolled recording medium 5 frontward (i.e., toward downstream X2 along the sub-scanning direction X) and ejecting ink from ink heads 40, 50, 60, 70, and 80 (all of which are shown in FIG. 2), which are mounted on a carriage 25 that moves along the main scanning direction Y. Insofar as the printer 10 herein is concerned, the directional term "downstream X2" means frontward, and the directional term "upstream X1" means rearward.

The recording medium 5 is an object on which images are to be printed. The recording medium 5 may be paper, such as plain paper or inkjet printing paper, for example. The recording medium 5 may also be a transparent sheet made of a material such as resin or glass, for example. The recording medium 5 may also be a sheet made of a material such as metal or rubber, for example. The recording medium 5 is not limited to any particular material. However, in the description of the present preferred embodiment, the recording medium 5 is preferably a transparent sheet.

As illustrated in FIG. 1, the printer 10 includes a printer main body 10a and legs 11 that support the printer main body 10a. The printer main body 10a extends along the main scanning direction Y. The printer main body 10a includes a guide rail 21 and a carriage 25 engaged with the guide rail 21. The guide rail 21 extends along the main scanning direction Y. The guide rail 21 guides movement of the carriage 25 along the main scanning direction Y. An endless belt 22 is secured to the carriage 25. The belt 22 is wrapped around a pulley 23a, which is disposed near the right end of the guide rail 21, and a pulley 23b, which is disposed near the left end of the guide rail 21. A carriage motor 24 is fitted to the right-side pulley 23a. The carriage motor 24 is electrically connected to a controller 100. The carriage motor 24 is controlled by the controller 100. Driven by the carriage motor 24, the pulley 23a rotates, and the belt 22 runs accordingly. This causes the carriage 25 to move in a main scanning direction Y along the guide rail 21. Thus, as the carriage 25 moves in a main scanning direction Y, the ink heads 40 to 80 move accordingly in the main scanning direction Y. In the present preferred embodiment, the belt 22, the pulley 23a, the pulley 23b, and the carriage motor 24 together define an example of a main-scanning-direction transfer device 20 that moves the carriage 25 and the ink heads 40 to 80, mounted on the carriage 25, along the main scanning direction Y.

A platen 12 is disposed below the carriage 25. The platen 12 extends along the main scanning direction Y. The recording medium 5 is to be placed on the platen 12. Pinch rollers that press the recording medium 5 downward from above are provided above the platen 12. The pinch rollers 31 are disposed rearward relative to the carriage 25. The platen 12 is provided with grit rollers 32. The grit rollers 32 are disposed below the pinch rollers 31. The grit rollers 32 are provided at positions that face the pinch rollers 31. The grit rollers 32 are connected to a feed motor 33 (see FIG. 3). The grit rollers 32 are rotatable by receiving the driving force from the feed motor 33. The feed motor 33 is electrically connected to the controller 100. The feed motor 33 is controlled by the controller 100. As the grit rollers 32 rotate with the recording medium 5 being pinched between the pinch rollers 31 and the grit rollers 32, the recording medium 5 is delivered in a sub-scanning direction X. In the present preferred embodiment, the pinch rollers 31, the grit rollers 32, and the feed motor 33 are an example of a sub-scanning-direction transfer device 30 that moves the recording medium 5 along the sub-scanning direction X.

FIG. 2 is a schematic view illustrating the configuration of the surface of the carriage 25 that faces the recording medium 5 (the bottom surface thereof in the present preferred embodiment). As illustrated in FIG. 2, the ink heads 40, 50, 60, 70, and 80 are provided in the bottom surface of the carriage 25. The plurality of ink heads 40, 50, 60, 70, and 80 are aligned in that order from the left L to the right R of the printer 10. Among the ink heads, the ink heads 50 to 80 are aligned with each other with respect to the sub-scanning direction X. The ink head 40 is shifted towards upstream X1 along the sub-scanning direction X, relative to the ink heads 50 to 80. A portion of the ink head 40 protrudes towards upstream X1 along the sub-scanning direction X relative to the ink heads 50 to 80, while the rest of the portions thereof overlap the ink heads 50 to 80 with respect to the sub-scanning direction X. The ink head 40 is an example of the "first ink head". The other four ink heads 50 to 80 are an example of the "second ink head".

In the present preferred embodiment, the ink head 40 ejects a special color ink that provides variety in hue and design in color images. The special color ink is preferably an ink other than process color inks such as CMYK inks, for example. Examples of the special color ink include white ink, metallic ink, such as silver ink and gold ink, and clear ink. The color tone of the special color ink is not limited to any color tone. In the description of the present preferred embodiment, however, the ink head 40 preferably ejects white ink, for example. In the present preferred embodiment, the special color ink is ejected by only one ink head, the ink head 40, but this is merely an example. The number of ink heads that eject the special color ink may be, for example, two or more.

As illustrated in FIG. 2, the ink head 40 includes a plurality of nozzles 41 arrayed along the sub-scanning direction X. The plurality of nozzles 41 are arrayed in a line along the sub-scanning direction X so as to define a nozzle array 42. The nozzle array 42 is, however, not limited to one line of nozzles, and may include two or more lines of nozzles. Although FIG. 2 shows that the ink head 40 includes only 10 nozzles, it should be noted that the actual ink head includes a much larger number of nozzles (for example, 300 nozzles). However, the number of nozzles is not limited to any particular number.

Each of the ink heads 50 to 80 ejects a process color ink that produces color images. In the present preferred embodiment, preferably, the ink head 50 ejects cyan ink, the ink head 60 ejects magenta ink, the ink head 70 ejects yellow ink, and the ink head 80 ejects black ink, for example. It should be noted that the number of the ink heads that eject a process color ink is not limited to 4. Moreover, the color tone of the process color ink is not limited to any particular color tone.

As illustrated in FIG. 2, each of the plurality of ink heads 50 to 80 includes a plurality of nozzles arrayed along the sub-scanning direction X. The plurality of nozzles in each of the ink heads are arrayed in a line along the sub-scanning direction X so as to define a nozzle array. More specifically, the ink head includes a plurality of nozzles 51 arrayed along the sub-scanning direction X, and the plurality of nozzles 51 define a nozzle array 52. The ink head 60 includes a plurality of nozzles 61 arrayed along the sub-scanning direction X, and the plurality of nozzles 61 define a nozzle array 62. The ink head 70 includes a plurality of nozzles 71 arrayed along the sub-scanning direction X, and the plurality of nozzles 71 define a nozzle array 72. The ink head 80 includes a plurality of nozzles 81 arrayed along the sub-scanning direction X, and the plurality of nozzles 81 define a nozzle array 82. The number of nozzle arrays in each of the ink heads is not limited to one, but may be, for example, two or more. The number of nozzles in each of the nozzle arrays 52, 62, 72, and 82 is equal to the number of the nozzles 41 in the nozzle array 42 of the ink head 40. Specifically, referring to FIG. 2, the number of nozzles per each ink head is preferably 10, for example. Four of the nozzles 51 of the ink head 50 that are provided most upstream X1 with respect to the sub-scanning direction X are aligned with four of the nozzles 41 of the ink head 40 that are provided most downstream X2 with respect to the sub-scanning direction X. The remaining six of the nozzles 51 are positioned more downstream X2 with respect to the sub-scanning direction X than the nozzles 41 of the ink head 40. The ink heads 60, 70, and 80 preferably also have the same or substantially the same nozzle arrangement. Four of the nozzles 61 that are provided most upstream X1 with respect to the sub-scanning direction X are aligned with four of the nozzles 41 of the ink head 40 that are provided most downstream X2 with respect to the sub-scanning direction X. Four of the nozzles 71 that are provided most upstream X1 with respect to the sub-scanning direction X are aligned with four of the nozzles 41 of the ink head 40 that are provided most downstream X2 with respect to the sub-scanning direction X. Four of the nozzles 81 that are provided most upstream X1 with respect to the sub-scanning direction X are aligned with four of the nozzles 41 of the ink head 40 that are provided most downstream X2 with respect to the sub-scanning direction X.

The nozzle array 42 of the ink head 40 is divided into two partial nozzle arrays 43 and 44 arrayed along the sub-scanning direction X. The partial nozzle array indicated by reference character 43 is referred to as a first partial nozzle array 43, and the partial nozzle array indicated by reference character 44 is referred to as a second partial nozzle array 44. The first partial nozzle array 43 includes five of the nozzles 41 that are disposed most upstream X1 with respect to the sub-scanning direction X. The second partial nozzle array 44 includes five of the nozzles 41 that are disposed second most upstream X1 with respect to the sub-scanning direction X (i.e., disposed most downstream X2 with respect to the sub-scanning direction X), next to the nozzles 41 of the first partial nozzle array 43. The number of the nozzles 41 in the first partial nozzle array 43 and the number of the nozzles 41 in the second partial nozzle array 44 are preferably equal (for example, 5 herein). The nozzle array 42 is divided into two equally-sized halves along the sub-scanning direction X, each with the first partial nozzle array 43 or the second partial nozzle array 44.

The nozzle array 52 of the ink head 50 is divided into three partial nozzle arrays 53, 54, and 55 arrayed along the sub-scanning direction X. The partial nozzle array 53 is a partial nozzle array that overlaps the nozzle array 42 of the ink head 40 with respect to the sub-scanning direction X. The nozzles 51 of the partial nozzle array 53 do not eject ink in the multi-layer print mode. Accordingly, the partial nozzle array indicated by reference character 53 is hereinafter referred to as a first non-use nozzle array 53. The partial nozzle array 54 includes, for example, five of the nozzles 51 that are disposed more downstream X2 with respect to the sub-scanning direction X than the first non-use nozzle array 53. The partial nozzle array 54 ejects cyan ink in the multi-layer print mode. The partial nozzle array 55 is disposed most downstream X2 with respect to the sub-scanning direction X. The partial nozzle array 55 includes, for example, one of the nozzles 51 that belongs to neither the first non-use nozzle array 53 nor the partial nozzle array 54. The nozzles 51 belonging to the partial nozzle array 55 also do not eject ink in the multi-layer print mode. For this reason, the partial nozzle array 55 is hereinafter referred to as a second non-use nozzle array 55, as appropriate. The details of the multi-layer print mode will be described later. The arrangement of the partial nozzle arrays in the ink heads 60, 70, and 80 is preferably the same or substantially the same as that of the partial nozzle array in the ink head 50. Specifically, as illustrated in FIG. 2, the nozzle array 62 of the ink head 60 is divided into a first non-use nozzle array 63, a partial nozzle array 64, and a second non-use nozzle array 65. The nozzle array 72 of the ink head 70 is divided into a first non-use nozzle array 73, a partial nozzle array 74, and a second non-use nozzle array 75. The nozzle array 82 of the ink head 80 is divided into a first non-use nozzle array 83, a partial nozzle array 84, and a second non-use nozzle array 85. The above-described dividing arrangement of the nozzle arrays is provided merely by control operations, and it does not mean that there is a structural difference between the nozzle arrays. Also, the above-described dividing arrangement of the nozzle arrays is provided for the multi-layer print mode, and for other print modes, different dividing arrangements may be provided (or no dividing arrangement is provided). The details of the other print modes will be described later, as well as the multi-layer print mode.

The ink head 40 and the ink heads 50 to 80 are provided with actuators (not shown) disposed therein, each of which includes, for example, a piezoelectric element. The actuators are electrically connected to the controller 100. The actuators are controlled by the controller 100. By actuating the actuators, ink is ejected towards the recording medium 5 from the plurality of nozzles 41 of the ink head 40, the plurality of nozzles 51 of the ink head 50, the plurality of nozzles 61 of the ink head 60, the plurality of nozzles 71 of the ink head 70, and the plurality of nozzles 81 of the ink head 80.

The ink head 40 and the ink heads 50 to 80 communicate with ink cartridges (not shown) respectively by ink supply passages (not shown). The ink cartridges may be provided detachably, for example, in a right end portion of the printer main body 10a. The materials of the inks are not limited in any way, and various types of materials that have conventionally been used as the ink materials for inkjet printers may be used. The inks may be solvent-based pigment inks or aqueous pigment inks, for example. The inks may also be aqueous dye inks, ultraviolet curing pigment inks that cure when irradiated with ultraviolet rays, or other suitable inks, for example.

As illustrated in FIG. 1, the printer 10 includes a heater 35. The heater 35 is disposed below the platen 12. The heater 35 is disposed frontward relative to the grit rollers 32. The heater 35 heats the platen 12. When the platen 12 is heated, the recording medium 5 placed on the platen 12 and the ink landed on the recording medium 5 are heated, and drying of the ink is facilitated. The heater 35 is electrically connected to the controller 100. The heating temperature of the heater 35 is controlled by the controller 100.

Figure 3:
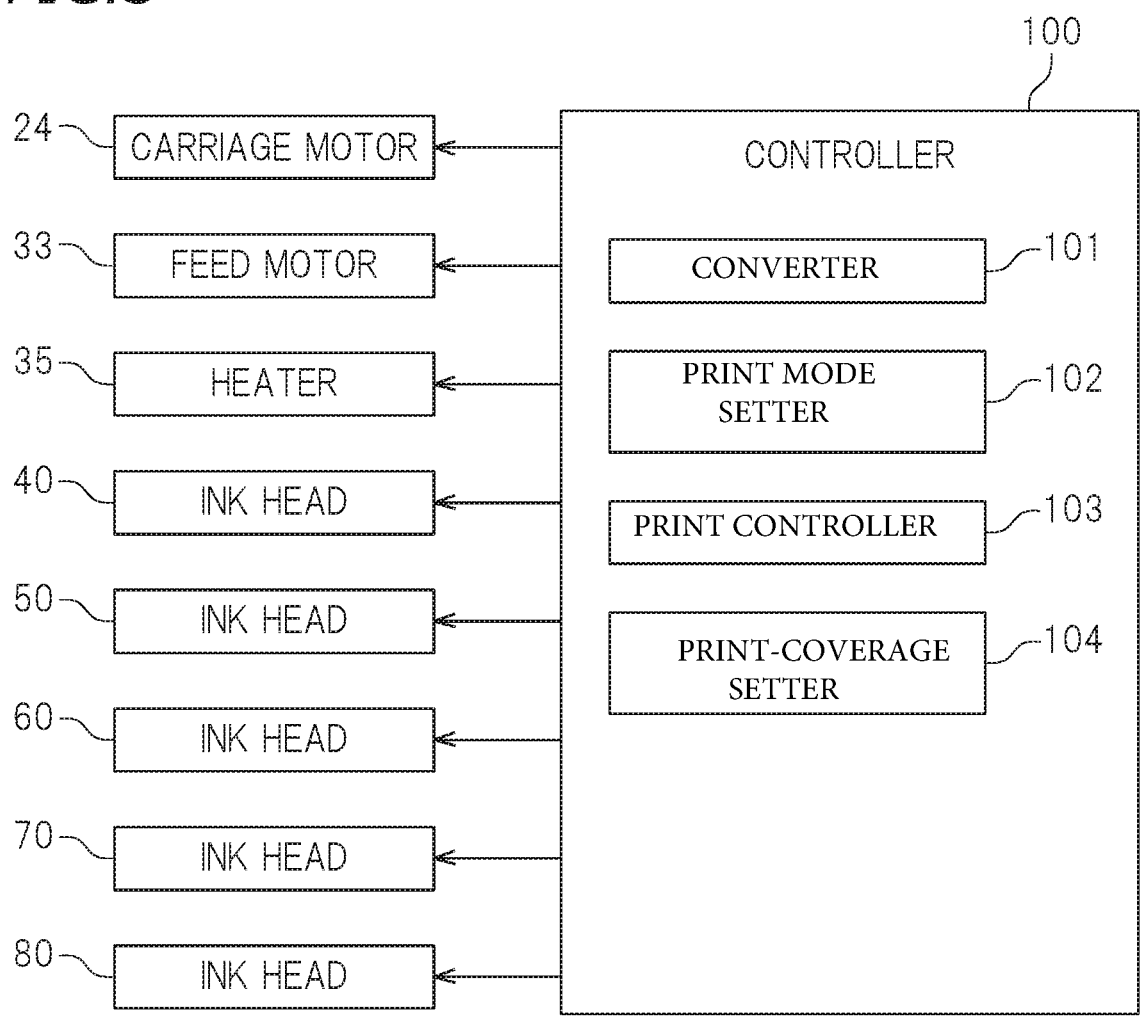
FIG. 3 is a block diagram illustrating the printer according to the first preferred embodiment of the present invention.

As illustrated in FIG. 1, an operation panel 110 is provided on a right end portion of the printer main body 10a. The operation panel 110 is provided with a display that displays the operating status, input keys to be operated by the user, and other controls. The controller 100 that controls various operations of the printer 10 is accommodated inside the operation panel 110. FIG. 3 is a block diagram illustrating the printer 10 according to the present preferred embodiment. As illustrated in FIG. 3, the controller 100 is communicatively connected to the feed motor 33, the carriage motor 24, the heater 35, and the ink heads 40 to 80, and the controller 100 is configured or programmed to control these components. The controller 100 is configured or programmed to include a converter 101, a print mode setter 102, a print controller 103, and a print-coverage setter 104.

The configuration of the controller 100 is not limited to a particular configuration. The controller 100 may be a microcomputer, for example. The hardware configuration of the microcomputer is not limited in any way. For example, the microcomputer may include an interface (I/F) that receives print data or other relevant data from external apparatuses, such as a host computer, a central processing unit (CPU) that executes control program instructions, a read only memory (ROM) that stores programs executed by the CPU, a random access memory (RAM) used as a working area to deploy the programs, and a storage device, such as a memory, that stores the foregoing programs and various data. The controller 100 need not be provided inside the printer main body 10a. For example, the controller 100 may be a computer that is provided external to the printer main body 10a and communicatively connected to the printer main body 10a via a wired or wireless communication.

The converter 101 performs what is called a screening process. The screening process is a process that converts image data into patterns of ink dots. A print image produced by an inkjet printer is an aggregate of ink dots of various process color inks. In the inkjet printer 10 according to the present preferred embodiment, an image is converted into ink dot patterns of four colors, cyan, magenta, yellow, and black. The undercoat color produced by white is also converted into an ink dot pattern of white ink. The converter 101 may be provided in the printer main body 10a or may be provided in, for example, an external computer. It should be noted that, in the following description, aggregates of ink dots that are generated by the converter 101 are referred to as "entire ink dot aggregates", as appropriate. Among them, an aggregate of ink dots of a specific color is referred to as an "entire ink dot aggregate of white ink", an "entire ink dot aggregate of cyan ink", or an "entire ink dot aggregate of process color ink", for example.

The print mode setter 102 sets a print mode and also instructs the print controller 103 to enter the print mode that has been set. In the present preferred embodiment, print modes are categorized as three print modes, a "single-layer print mode", a "dual-layer print mode", and a "multi-layer print mode". In the single-layer print mode, the printer 10 prints only a print layer formed of ink dots of process color inks (which is hereinafter referred to as a "process color ink layer") on the recording medium 5. The single-layer print mode is a normal image print mode. In the dual-layer print mode, the printer 10 prints a print layer formed of ink dots of a special color ink (which is hereinafter referred to as a "special color ink layer") on the recording medium 5, by ejecting the special color ink from the ink head 40. The printer 10 also prints a process color ink layer on the recording medium 5 by ejecting process color inks from the ink heads 50 to 80. The special color ink layer and the process color ink layer are overlapped with each other. The print layers in the dual-layer print mode include two layers in total, one special color ink layer and one process color ink layer. The dual-layer print mode is a print mode similar to the overprinting performed by known inkjet printers. The multi-layer print mode is a print mode in which three or more layers of the special color ink layer and the process color ink layer are printed in total. Although the number of print layers in the multi-layer print mode is not limited, in the multi-layer print mode according to the present preferred embodiment, the number of print layers is preferably three, for example. Hereinafter, the bottommost print layer of the three print layers is referred to as a first print layer, as appropriate. The print layer printed over the first print layer is referred to as a second print layer. The print layer further printed over the second print layer is referred to as a third print layer.

The print controller 103 is configured or programmed to control operations of various components to cause the various portions or components to perform printing on the recording medium 5. The print controller 103 is connected to the carriage motor 24, the feed motor 33, and the ink heads 40, 50, 60, 70, and 80. The print controller 103 controls these portions or components to perform printing on the recording medium 5. The print controller 103 allows each one of the print layers to be either one of the special color ink layer or the process color ink layer. What kind of layer should be printed for each of the print layers is determined according to instructions from the print mode setter 102 and a print-coverage setter 104 that will be described below. The print controller 103 is connected to the heater 35. By controlling the temperature of the heater 35, the print controller 103 controls drying of the special color ink and the process color inks after ejection.

The print-coverage setter 104 extracts a portion (or all) of the ink dots from the entire ink dot aggregate of special color ink using a predetermined mask. More specifically, the print-coverage setter 104 extracts a predetermined proportion of ink dots from the entire ink dot aggregate of special color ink (the proportion is hereinafter referred to as a "print coverage"). The extraction is performed for each of the print layers. For example, when the first print layer and the second print layer are set to be special color ink layers, the print-coverage setter 104 extracts ink dots that are to be printed for the first print layer, using a mask for which a first print coverage is set. The print-coverage setter 104 also extracts ink dots that are to be printed for the second print layer, using a mask for which a second print coverage is set. In the present preferred embodiment, the print coverages are set by the operator. The print-coverage setter 104 displays an operation panel screen image on, for example, the operation panel 110 or a display device of an external computer. The operator sets the print coverage for each of the print layers, for example, by the operation panel screen. The details of the print coverage setting and ink dot extraction performed by the print-coverage setter 104 will be described in detail below. The print controller 103 causes each of the print layers to be printed based on the print coverage that is set by the print-coverage setter 104. Note that, with the print-coverage setter 104 according to the present preferred embodiment, the print coverages are set by an operation panel screen or other suitable control, but this is merely an example. For example, in other preferred embodiments, the print coverages may be incorporated in the print data in advance. The print-coverage setter 104 may be configured and/or programmed to automatically set print coverages based on the previously-incorporated print coverages.

The printer 10 according to the present preferred embodiment performs printing in the single-layer print mode in the following manner. In the single-layer print mode, the print controller 103 drives the carriage motor 24 so as to cause the carriage 25 to move along the main scanning direction Y and also drives actuators so as to cause the ink heads 50 to 80 to eject process color inks, to thus print a first print layer that is a process color ink layer on the recording medium 5. During this printing process, the print controller 103 controls the feed motor so that the recording medium 5 is delivered consecutively frontward F (i.e., toward downstream X2 along the sub-scanning direction X). On the recording medium 5 delivered by the feed motor 33, the process color ink is consecutively heated and dried by the heater 35. The print controller 103 causes the carriage 25 to move along the main scanning direction Y one time or a plurality of times by the time the recording medium 5 is transported frontward F one time.

In the dual-layer print mode, the ink head 40, in addition to the ink heads 50 to 80, also ejects ink. The ink ejected from the ink head 40 is preferably a white ink, for example.

In the dual-layer print mode, the print controller 103 drives the carriage motor 24 so as to cause the carriage 25 to move along the main scanning direction Y, and also drives an actuator so as to cause a portion of the nozzles 41 of the ink head 40 to eject the white ink. More specifically, the print controller 103 causes eight of the nozzles 41 of the ink head 40 that are disposed upstream X1 with respect to the sub-scanning direction X to eject the white ink, for example. As a result of the ejection of the white ink, the print controller 103 causes a first print layer that is a special color ink layer to be printed on the recording medium 5. After the printing of the first print layer, the print controller 103 controls the feed motor 33 to feed the recording medium 5 towards downstream X2 in the sub-scanning direction X. After the feeding, the print controller 103 causes eight nozzles of each of the nozzles 51 to 81 of the ink heads 50 to 80 that are disposed downstream X2 with respect to the sub-scanning direction X to eject process color inks, for example. As a result of the ejection of the process color inks, a second print layer that is a process color ink layer is printed on the recording medium 5. The number of the nozzles 41 ejecting the white ink and the number of the nozzles 51 to 81 ejecting the process color inks are preferably equal (for example, 8 herein). In addition, the nozzles ejecting the white ink are disposed more upstream X1 with respect to the sub-scanning direction X than the nozzles 51 to 81 ejecting the process color inks. As a result, the printer 10 according to the present preferred embodiment is able to perform the dual-layer printing continuously.

The overprinting in the dual-layer print mode described above is the same or substantially the same as the known overprinting that has been conducted in the past. The overprinting is typically performed for the purpose of printing an undercoat layer for a transparent recording medium, such as in the description of the present preferred embodiment. The undercoat layer in the overprinting provides a certain visual effect on a printed image. Herein, an example of the visual effect is a light shielding effect resulting from the white ink. However, there are some instances where the required visual effect may not be obtained sufficiently due to, for example, the print resolution and other constraints of the printer 10. In the present preferred embodiment, an example is an insufficient light shielding effect resulting from shortage of the dot density of the white ink.

In view of this, the printer 10 according to the present preferred embodiment includes the print mode setter 102 that is able to set the multi-layer print mode so that three or more print layers are overlapped with each other on the recording medium 5. In the overprinting in the multi-layer print mode, both types of print layers, a print layer that is the special color ink layer and a print layer that is the process color ink layer, are printed. The number of print layers is three or more, for example. This means that at least one of the special color ink layer and the process color ink layer includes two or more layers. In the present preferred embodiment, preferably the number of print layers in the multi-layer print mode is 3, for example, and the first print layer and the second print layer are special color ink layers. The third print layer is a process color ink layer.

With the printer 10 according to the present preferred embodiment, printing is performed to obtain visual effects resulting from the special color ink more effectively, by overlapping two layers of the special color ink layer. For example, as in the present preferred embodiment, when the special color ink layers of white ink are printed on a transparent sheet, the special color ink layers have a more effective light shielding effect. Even in other cases, similar advantageous effects may be obtained when there is a need for reinforcing or enhancing the special color ink layer. For example, this printing technique may be applied to such cases in which the special color ink is a metallic ink but the visual effects of the metallic ink are weaker than expected.

Figure 4:
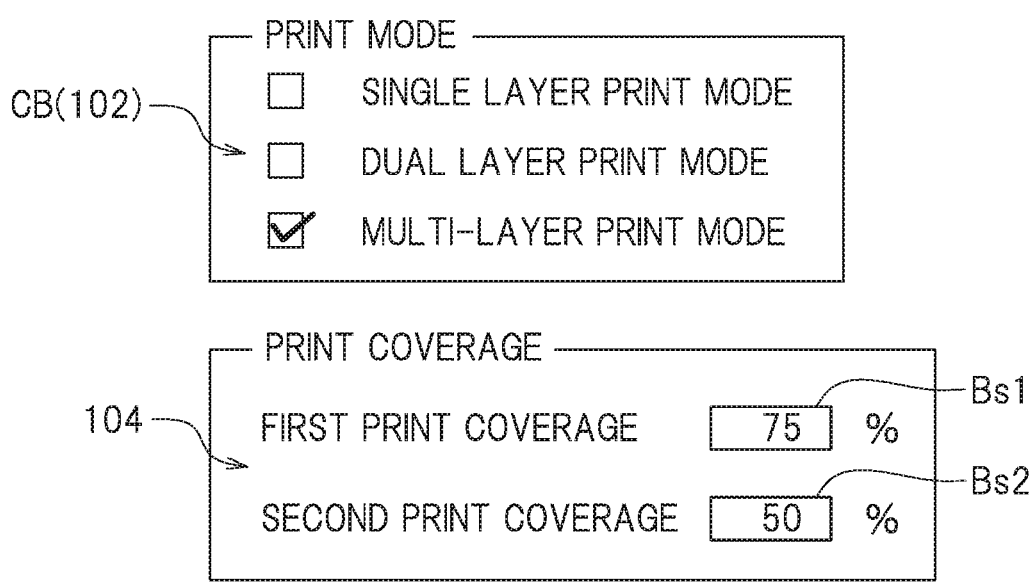
FIG. 4 is a view illustrating an example of an operation panel screen according to the first preferred embodiment of the present invention.

The following describes a process of performing overprinting in the multi-layer print mode in the printer 10 according to the present preferred embodiment. FIG. 4 is a view illustrating an example of an operation panel screen for the print mode setter 102 and the print-coverage setter 104. As illustrated in FIG. 4, the operation panel screen according to the present preferred embodiment includes check boxes CB enabling the operator to select a print mode. The operation panel screen also includes a first input box Bs1 and a second input box Bs2 that enable the operator to input the print coverage of each of the first print layer and the second print layer. By checking one of the check boxes, the check boxes CB enable the operator to select one of the single-layer print mode, the dual-layer print mode, and the multi-layer print mode. As for the printer 10 according to the present preferred embodiment, each of the print layers in the multi-layer print mode has a predetermined role or function. That is, in the multi-layer print mode according to the present preferred embodiment, each of the first print layer and the second print layer is predetermined to be a special color ink layer and the third print layer is predetermined to be a process color ink layer. The present preferred embodiment preferably does not use any other setting. Preferred embodiments that may use configurations other than the one described above will be described in the second preferred embodiment. When the multi-layer print mode is selected, the first input box Bs1 and the second input box Bs2 are allowed to accept an input of the print coverage. The first input box Bs1 allows the operator to input the print coverage for the first print layer (hereinafter referred to as a "first print coverage"). The first print coverage is the proportion of ink dots of the special color ink to be printed in the first print layer with respect to the entire ink dot aggregate of special color ink. The second input box Bs2 allows the operator to input the print coverage for the second print layer (hereinafter referred to as a "second print coverage"). The second print coverage is the proportion of ink dots of the special color ink to be printed in the second print layer with respect to the entire ink dot aggregate of special color ink.

The ink dots to be printed for the first print layer are extracted from the entire ink dot aggregate of special color ink by, for example, a random mask. In the example shown in FIG. 4, the first print coverage, which is input in the first input box Bs1, is preferably about 75%, for example. Accordingly, the print-coverage setter 104 extracts the ink dots of the special color ink that are to be printed for the first print layer in a proportion of about 75% at random from the entire ink dot aggregate of special color ink. Similarly, the print-coverage setter 104 extracts the ink dots of the special color ink that are to be printed for the second print layer at random from the entire ink dot aggregate of special color ink, based on the second print coverage that is input into the second input box Bs2. In the example shown in FIG. 4, the second print coverage is preferably about 50%, for example. Therefore, a total of about 125%, which is the sum of the first print coverage of about 75% and the second print coverage of about 50%, is set as a cumulative print coverage, for example.

In the example described above, the printer 10 according to the present preferred embodiment stacks two layers of "sparse" special color ink layers, about 75% and about 50%, on top of another to finally print a high-density undercoat layer. However, the special color ink layer to be printed for each of the print layers may not necessarily be a "sparse" special color ink layer as described above. All of the print layers may be set to have a print coverage of 100%. The mask used to extract the ink dots to be printed in the first print layer and the second print layer is not limited to the random mask. For example, it is possible that the print-coverage setter 104 may preferentially extract, as the ink dots for the second print layer, the ink dots that have not been extracted as the ink dots for the first print layer. In other words, the ink dots printed for the first print layer and the ink dots printed for the second print layer may be in a complementary relationship. The mask may be a mask that extracts the ink dots using a statistical technique.

The ink dots of the process color ink that are to be printed for the third print layer are the entire ink dot aggregate of process color ink. In other words, an image to be provided by the process color inks is printed as it is in the third print layer. The third print coverage is preferably 100%.

After the ink dots have been allocated to each of the print layers as described above, printing is performed on the recording medium 5. The following describes a print process that is performed in the case shown in FIG. 4. FIG. 5A is a schematic view illustrating a region on the recording medium 5 at a certain point in time in a multi-layer print mode. A plan view of the carriage 25 seen from the top U is shown on the left of FIG. 5A. The recording medium 5 is shown to the right of the carriage 25. In FIG. 5A, a region of the recording medium 5 that is positioned directly above the carriage 25 is shown to the right of the carriage 25. For example, at the point in time shown in FIG. 5A, the region on the recording medium 5 that is positioned directly below the first partial nozzle array 43 of the ink head 40 is a region A1. Referring to FIG. 5A, a first print layer L1 is printed on the region A1. The first print layer L1 includes the ink dots of the white ink ejected from the nozzles 41 of the first partial nozzle array 43. In the first print layer L1 shown in FIG. 5A, the first print coverage P1 for the first print layer L1 (P1=75% herein) is indicated. This means that about 75% of the ink dots of the entire ink dot aggregate of white ink are printed on the region A1, and that those ink dots define the first print layer L1. The ink dots of the white ink that are printed for the first print layer L1 are indicated as Ds1 in FIG. 5A. In the region A1, the cumulative print coverage of the white ink up to that point in time (indicated as "total" in FIG. 5A) is also indicated. The nozzles that are ejecting ink at the point in time shown in FIG. 5A are indicated by hatching. This also applies to FIGS. 5B and 5C, which will be discussed later.

FIG. 5B is a schematic view illustrating regions on the recording medium 5 in a pass subsequent to the point in time shown in FIG. 5A. Between the point in time illustrated by FIG. 5A and the point in time illustrated by FIG. 5B, the print controller 103 controls the feed motor 33 to feed the recording medium 5 one time frontward F. This causes the region A1 to move to a position directly below the second partial nozzle array 44, so that a next region A2, the next one to the region A1, is positioned directly below the first partial nozzle array 43. In the region A1 shown in FIG. 5B, both of the first print layer L1 (first print coverage P1=75%) and the second print layer L2 (second print coverage P2=50%) are indicated, and the cumulative print coverage of the white ink, total=about 125%, is also indicated. This means that, at the point in time illustrated by FIG. 5B, the first print layer L1 and the second print layer L2 are overlapped on the region A1, and at that point in time, the cumulative print coverage of the white ink for the region A1 is about 125%.

The second print layer L2 is also a print layer including ink dots of the white ink. The ink dots of the white ink that define the second print layer L2 are indicated as Ds2 in FIG. 5B. The ink dots Ds2 are the white ink ejected from the nozzles 41 of the second partial nozzle array 44 of the ink head 40. In the region A2 of FIG. 5B, the first print layer L1 is defined by the ink dots Ds1 of the white ink ejected from the nozzles 41 of the first partial nozzle array 43.

FIG. 5C is a schematic view illustrating regions on the recording medium 5 at a next pass subsequent to the point in time illustrated by FIG. 5B. Between the point in time illustrated by FIG. 5B and the point in time illustrated by FIG. 5C, the print controller 103 controls the feed motor 33 to feed the recording medium 5 one time frontward F. Accordingly, the region A1 has been moved to a position directly below the partial nozzle arrays 54 to 84 of the ink heads 50 to 80. A next region A3, the next one to the region A2, is positioned directly below the first partial nozzle array 43 of the ink head 40. The region A2 is positioned directly below the second partial nozzle array 44 of the ink head 40. Indicated in the region A1 shown in FIG. 5C are the first print layer L1 (first print coverage P1=about 75%) produced by the white ink, the second print layer L2 (second print coverage P2=about 50%) produced by the white ink, the cumulative print coverage of the white ink (total=about 125%), and the third print layer L3 (third print coverage P3=about 100%) produced by the process color inks. The third print layer L3 is a print layer including ink dots Dp of the process color inks. This means that, at the point in time illustrated by FIG. 5C, the first print layer L1, the second print layer L2, and the third print layer L3 are overprinted on the region A1 so that the special color ink layers with a cumulative print coverage of about 125% and the process color ink layer with about 100% are provided in the region A1. The ink dots Dp are the process color inks ejected from the respective nozzles of the partial nozzle arrays 54, 64, 74, 84 of the ink heads 50 to 80. In addition, the first print layer L1 including the ink dots Ds1 of white ink and the second print layer L2 including the ink dots Ds2 of white ink are overlapped on the region A2 shown in FIG. 5C. In the region A3, the first print layer L1 is provided, which includes the ink dots Ds1 of the white ink ejected from the nozzles 41 of the first partial nozzle array 43.

As described above, the printer 10 according to the present preferred embodiment is able to perform multi-layer printing through the overprinting that is preferably performed three times continuously, for example. For that purpose, the printer 10 according to the present preferred embodiment is preferably configured so that all of the first partial nozzle array 43 of the ink head 40, the second partial nozzle array 44 of the ink head 40, and the partial nozzle arrays 54 to 84 of the ink heads 50 to 80 have the same number (for example, 5 herein) of nozzles, and in the carriage 25, the first partial nozzle array 43, the second partial nozzle array 44, and the partial nozzle arrays 54 to 84 are arranged in that order from upstream X1 along the sub-scanning direction X.

The print-coverage setter 104 according to the present preferred embodiment is able to set a desired first print coverage for the mask relating to the first print layer and is also able to set a desired second print coverage for the mask relating to the second print layer. With the printer 10 according to the present preferred embodiment, it is possible to control the drying conditions of ink by adjusting the first and the second print coverages. More specifically, by setting a print coverage so as to enable the ink to dry sufficiently by the time of the next ink ejection, ink feathering caused by overlapping of the ink is prevented, and consequently, a high-quality image is produced. When drying of the ink raises a problem, the drying capability of the heater 35 is also taken into consideration in determining the print coverage for each of the print layers.

In the foregoing preferred embodiment, the operation panel screen is illustrated as having a design as shown in FIG. 4, but the operation panel screen is not limited thereto. For example, the setting operation may be more simplified, and only a cumulative print coverage value for the special color ink layers may be required as the input. In that case, the print coverage allocated to each of the first print layer and the second print layer is automatically set by the print-coverage setter 104. For example, the cumulative print coverage may be divided into equal rates. Alternatively, the allocation of print coverage may be performed according to a predetermined rule stored in the print-coverage setter 104.

Second Preferred Embodiment

In addition to the multi-layer print mode in which a special color ink layer is printed under a process color ink layer (which has been described in the first preferred embodiment), the second preferred embodiment of the present invention is provided with a multi-layer print mode in which a special color ink layer is printed over a process color ink layer. The printer 10 according to the second preferred embodiment alternatively selects one of the multi-layer print mode in which a special color ink layer is printed under a process color ink layer and the multi-layer print mode in which a process color ink layer is printed under a special color ink layer, and performs multi-layer printing in accordance with the selected print mode. In order to provide the above-described two multi-layer print modes, the printer 10 according to the second preferred embodiment has a different nozzle arrangement from that of the printer 10 according to the first preferred embodiment. Note that the printer 10 according to the second preferred embodiment is the same or substantially the same as that according to the first preferred embodiment, except for the features that relate to the different nozzle arrangement. In the following description of the second preferred embodiment, the same parts and elements as in the first preferred embodiment are designated by the same reference numerals and will not be further elaborated upon. The same applies to the third and subsequent preferred embodiments.

FIG. 6 is a schematic view illustrating the configuration of the bottom surface of the carriage 25 according to the present preferred embodiment. As illustrated in FIG. 6, the ink head 40 and the ink heads 50 to 80 are provided at the bottom of the carriage 25. As in the first preferred embodiment, the ink head 40 is an ink head that ejects a special color ink (to be precise, preferably a white ink herein). Each of the ink heads 50 to 80 is an ink head that ejects a process color ink. More specifically, preferably, the ink head 50 ejects cyan ink, the ink head 60 ejects magenta ink, the ink head 70 ejects yellow ink, and the ink head 80 ejects black ink. As illustrated in FIG. 6, in the carriage 25, the first ink head 40 and the ink heads 50 to 80 are arranged side by side along the main scanning direction Y.

As illustrated in FIG. 6, the ink head 40 includes a plurality of nozzles 41 arrayed along the sub-scanning direction X. Referring to FIG. 6, the ink head 40 includes 16 nozzles 41, for example. However, an actual ink head 40 may be provided with a far larger number of nozzles. The plurality of nozzles 41 are arrayed in a line along the sub-scanning direction X so as to define a nozzle array 42 in the ink head 40. The nozzle array 42 is, however, not limited to one line of nozzles, but may include two or more lines of nozzles. The nozzle array 42 includes a first partial nozzle array 42a, a second partial nozzle array 42b, a third partial nozzle array 42c, and a non-use nozzle array 42n. The first partial nozzle array 42a preferably includes five of the nozzles 41, for example, that are disposed most upstream X1 with respect to the sub-scanning direction X. The second partial nozzle array 42b preferably includes five of the nozzles 41, for example, that are disposed second most upstream X1 with respect to the sub-scanning direction X, next to the five nozzles 41 belonging to the first partial nozzle array 42a. The third partial nozzle array 42c preferably includes five of the nozzles 41, for example, that are disposed third most upstream X1 with respect to the sub-scanning direction X, next to the five nozzles 41 belonging to the second partial nozzle array 42b. The number of the nozzles 41 in the first partial nozzle array 42a, the number of the nozzles 41 in the second partial nozzle array 42b, and the number of the nozzles 41 in the third partial nozzle array 42c are preferably equal (for example, 5 herein). The non-use nozzle array 42n preferably includes one nozzle 41, for example, that is disposed more downstream X2 with respect to the sub-scanning direction X than the third partial nozzle array 42c (i.e., disposed most downstream X2 with respect to the sub-scanning direction X). The non-use nozzle array 42n includes a nozzle that does not eject ink in the multi-layer print mode according to the present preferred embodiment.

The ink head 50 includes a plurality of nozzles 51 arrayed along the sub-scanning direction X. Similar to the ink head 40, the ink head 50 is furnished with 16 nozzles 51, for example. The plurality of nozzles 51 are arrayed in a line along the sub-scanning direction X so as to define a nozzle array 52 in the ink head 50. The nozzle array 52 is, however, not limited to one line of nozzles, but may include two or more lines of nozzles. The nozzle array 52 includes a first partial nozzle array 52a, a second partial nozzle array 52b, a third partial nozzle array 52c, and a non-use nozzle array 52n. The first partial nozzle array 52a preferably includes five of the nozzles 51, for example, that are disposed most upstream X1 with respect to the sub-scanning direction X. The second partial nozzle array 52b preferably includes five of the nozzles 51, for example, that are disposed second most upstream X1 with respect to the sub-scanning direction X, next to the five nozzles 51 belonging to the first partial nozzle array 52a. The third partial nozzle array 52c preferably includes five of the nozzles 51, for example, that are disposed third most upstream X1 with respect to the sub-scanning direction X, next to the five nozzles 51 belonging to the second partial nozzle array 52b. The number of the nozzles 51 in the first partial nozzle array 52a, the number of the nozzles 51 in the second partial nozzle array 52b, and the number of the nozzles 51 in the third partial nozzle array 52c are preferably equal (5 herein). Accordingly, the length of the first partial nozzle array 52a along the sub-scanning direction X, the length of the second partial nozzle array 52b along the sub-scanning direction X, and the length of the third partial nozzle array 52c along the sub-scanning direction X are also equal. The non-use nozzle array 52n preferably includes one nozzle 51, for example, that is disposed more downstream X2 with respect to the sub-scanning direction X than the third partial nozzle array 52c (i.e., disposed most downstream X2 with respect to the sub-scanning direction X). The non-use nozzle array 52n includes a nozzle that does not eject ink in the multi-layer print mode according to the present preferred embodiment.

The first partial nozzle array 52a of the ink head 50 is disposed at a position aligned with the first partial nozzle array 42a of the ink head 40 with respect to the sub-scanning direction X. In addition, the first partial nozzle array 52a of the ink head 50 preferably includes the same number of nozzles as the first partial nozzle array 42a of the ink head 40. The length of the first partial nozzle array 42a of the ink head 40 along the sub-scanning direction X is preferably equal or substantially equal to the length of the first partial nozzle array 52a of the ink head 50 along the sub-scanning direction X. The relationship between the second partial nozzle array 42b of the ink head 40 and the second partial nozzle array 52b of the ink head 50 is also preferably the same. The relationship between the third partial nozzle array 42c of the ink head 40 and the third partial nozzle array 52c of the ink head 50 is also preferably the same. Specifically, the second partial nozzle array 52b of the ink head 50 is disposed at a position aligned with the second partial nozzle array 42b of the ink head 40 with respect to the sub-scanning direction X. The number of the nozzles 51 in the second partial nozzle array 52b of the ink head 50 is preferably equal to the number of the nozzles 41 in the second partial nozzle array 42b of the ink head 40. The third partial nozzle array 52c of the ink head 50 is disposed at a position aligned with the third partial nozzle array 42c of the ink head 40 with respect to the sub-scanning direction X. The number of the nozzles 51 in the third partial nozzle array 52c of the ink head 50 is preferably equal to the number of the nozzles 41 in the third partial nozzle array 42c of the ink head 40.

The other ink heads 60, 70, and 80 also preferably have the same or substantially the same configuration as that of the ink head 50. Specifically, the ink head 60 includes a nozzle array 62 including a first partial nozzle array 62a, a second partial nozzle array 62b, a third partial nozzle array 62c, and a non-use nozzle array 62n. The ink head 70 includes a nozzle array 72 including a first partial nozzle array 72a, a second partial nozzle array 72b, a third partial nozzle array 72c, and a non-use nozzle array 72n. The ink head 80 includes a nozzle array 82 including a first partial nozzle array 82a, a second partial nozzle array 82b, a third partial nozzle array 82c, and a non-use nozzle array 82n. Across the ink heads 40 to 80, the first partial nozzle arrays are aligned with each other with respect to the sub-scanning direction X, the second partial nozzle arrays are also aligned with each other with respect to the sub-scanning direction X, and the third partial nozzle arrays are also aligned with each other with respect to the sub-scanning direction X. All of these partial nozzle arrays preferably have the same number of nozzles.

Although not shown in the drawings, the print mode setter 102 according to the present preferred embodiment is configured to be able to select a multi-layer print mode in which special color ink layers are printed under a process color ink layer (hereinafter referred to as a "first multi-layer print mode") and a multi-layer print mode in which special color ink layers are printed over a process color ink layer (hereinafter referred to as a "second multi-layer print mode"). In other words, in the first multi-layer print mode, the bottommost two print layers are set to be special color ink layers. In the second multi-layer print mode, the topmost two print layers are set to be special color ink layers. In the printer 10 according to the present preferred embodiment as well, the number of the print layers in the multi-layer print mode is preferably 3, for example. Of the three print layers, two are the special color ink layers and one is the process color ink layer. Accordingly, in the first multi-layer print mode, the special color ink layers are provided for the first print layer and the second print layer, and the process color ink layer is provided for the third print layer. In the second multi-layer print mode, the special color ink layers are provided for the second print layer and the third print layer, and the process color ink layer is provided for the first print layer.

FIGS. 7A, 7B, and 7C are schematic views illustrating a printing process in the second multi-layer print mode. FIG. 7A shows a region on the recording medium 5 at a certain point in time in the second multi-layer print mode. FIG. 7B shows regions on the recording medium 5 at a next pass point in time subsequent to the point in time illustrated by FIG. 7A, and FIG. 7C shows regions on the recording medium 5 at a next pass point in time subsequent to the point in time illustrated by FIG. 7B. In FIGS. 7A, 7B, and 7C, the same reference characters are used as those in FIGS. 5A, 5B, and 5C. In FIGS. 7A, 7B, and 7C as well as in FIGS. 5A, 5B, and 5C, the nozzles that are ejecting ink are indicated by hatching.

In the second multi-layer print mode illustrated in FIGS. 7A, 7B, and 7C, the process color ink layer is provided for the first print layer L1. The first print coverage P1 is about 100%. In other words, what is printed for the first print layer L1 is an image produced by the process color inks as it is. For the second print layer L2, the white ink is ejected at a second print coverage P2=about 75%, for example. For the third print layer L3, the white ink is ejected at a third print coverage P3=about 50%, for example.

In FIG. 7A, the first print layer L1 is printed for a region A1 on the recording medium 5. The first print layer L1 includes ink dots Dp of the process color inks. The ink dots Dp of the process color inks are defined by the process color inks ejected from the respective nozzles of the first partial nozzle arrays 52a, 62a, 72a, 82a of the ink heads 50 to 80. As mentioned above, the first print coverage P1 is about 100%.

FIG. 7B shows regions on the recording medium 5 at a next pass subsequent to the point in time shown in FIG. 7A. Between the point in time illustrated by FIG. 7A and the point in time illustrated by FIG. 7B, the print controller 103 controls the feed motor 33 to feed the recording medium 5 one time frontward F. In FIG. 7B, the second print layer L2 is printed for the region A1, and, simultaneously, the first print layer L1 is printed for a region A2, which is located upstream of the region A1. The printing of the first print layer L1 that is performed for the region A2 is the same or substantially the same as the printing of the first print layer L1 having been performed for the region A1 in FIG. 7A. The printing of the second print layer L2 that is performed for the region A1 is printing of a special color ink layer. More specifically, a special color ink layer is printed at a second print coverage P2=about 75%. Ink dots Ds2 of special color ink that define the second print layer L2 are the white ink ejected from the nozzles 41 of the second partial nozzle array 42b of the ink head 40. As a result of the printing of the second print layer L2, an image layer of the process color inks and an undercoat layer (with a print coverage of about 75%) of the white ink are printed in the region A1.

FIG. 7C shows regions on the recording medium 5 at a next pass further subsequent to the point in time illustrated by FIG. 7B. Between the point in time illustrated by FIG. 7B and the point in time illustrated by FIG. 7C, the print controller 103 controls the feed motor 33 to feed the recording medium 5 one time frontward F. In FIG. 7C, the third print layer L3 is printed for the region A1. Simultaneously, the second print layer L2 is printed for the region A2. Moreover, the first print layer L1 is printed for a region A3, which is located upstream of the region A2. The printing of the first print layer L1 that is performed for the region A3 is the same or substantially the same as the printing of the first print layer L1 having been performed for the region A1 in FIG. 7A. The printing of the second print layer L2 that is performed for the region A2 is the same or substantially the same as the printing of the second print layer L2 that has been performed for the region A1 in FIG. 7B. The printing of the third print layer L3 that is performed for the region A1 is printing of a special color ink layer. More specifically, a special color ink layer is printed at a third print coverage P3=about 50%. Ink dots Ds3 of special color ink that define the third print layer L3 are the white ink ejected from the nozzles 41 of the third partial nozzle array 42c of the ink head 40. As a result of the printing of the third print layer L3, an image layer of the process color inks and an undercoat layer (with a cumulative print coverage of about 125%) of the white ink are printed in the region A1.

The multi-layer printing in the first multi-layer print mode is performed by a process analogous to the multi-layer printing in the above-described second multi-layer print mode. However, the first multi-layer print mode and the second multi-layer print mode use different nozzles. FIG. 8 is a schematic view illustrating a printing process in the first multi-layer print mode, showing a point in time corresponding to FIG. 7C. Specifically, FIG. 8 shows a point in time at which the third print layer L3 is printed for the region A1, the second print layer L2 is printed for the region A2, and the first print layer L1 is printed for the region A3. The first multi-layer print mode is a print mode in which each of the first print layer L1 and the second print layer L2 is a special color ink layer and the third print layer L3 is a process color ink layer. In the first multi-layer print mode, the nozzles 41 in the first partial nozzle array 42a of the ink head 40 eject white ink, as illustrated in FIG. 8. This white ink defines the first print layer L1. Similarly, white ink is ejected from the nozzles 41 of the second partial nozzle array 42b of the ink head 40. This white ink defines the second print layer L2. The nozzles in the third partial nozzle arrays 52c, 62c, 72c, 82c of the ink heads 50 to 80 eject process color inks. These process color inks define the third print layer L3.

As described above, the printer 10 according to the present preferred embodiment is able to perform multi-layer printing continuously in either of the print modes, the first multi-layer print mode, or the second multi-layer print mode.

Third Preferred Embodiment

In the third preferred embodiment of the present invention, ink dots of process color ink are allowed to be mixed into a special color ink layer. Specifically, the present preferred embodiment makes it possible to extract a portion or all of the ink dots from the entire ink dot aggregate of process color ink in the same or substantially the same technique as used to extract ink dots from the entire ink dot aggregate of special color ink in the first and the second preferred embodiments, and to mix a portion or all the extracted ink dots into a special color ink layer. The third preferred embodiment is the same or substantially the same as the second preferred embodiment, except for the features that relate to the configuration described above. However, the configuration may also be combined with the first preferred embodiment. It is also possible to combine the configuration with other possible preferred embodiments.

Figure 9:
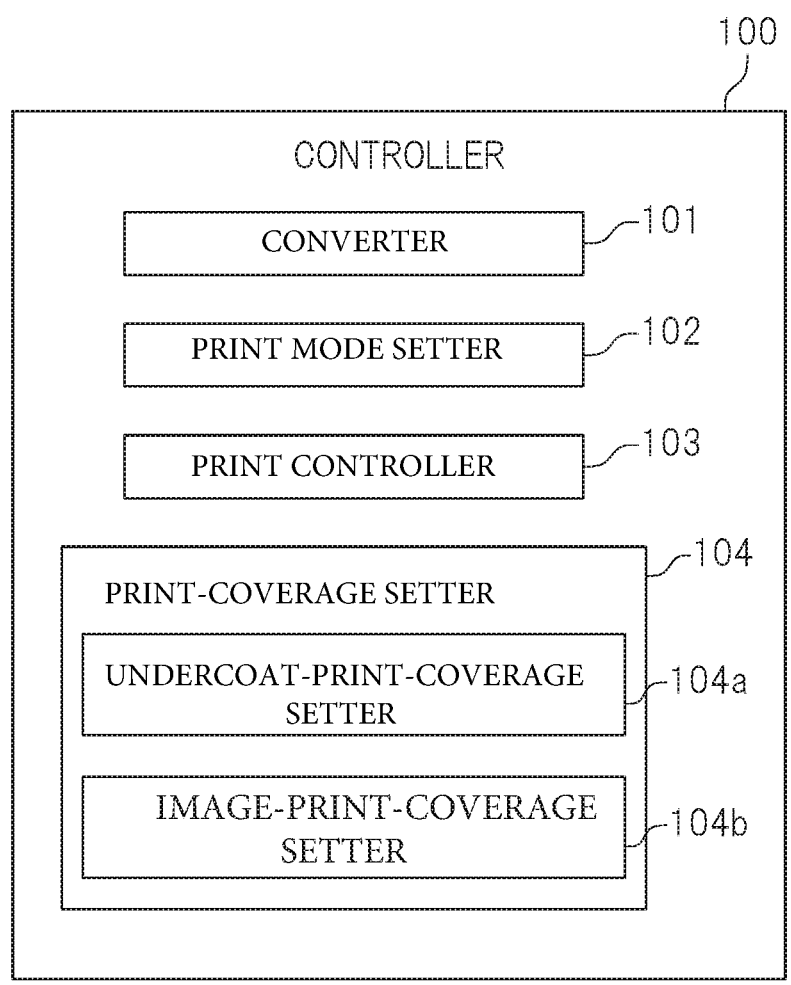
FIG. 9 is a block diagram illustrating a controller according to a third preferred embodiment of the present invention.

FIG. 9 is a block diagram illustrating the controller 100 according to the present preferred embodiment. As illustrated in FIG. 9, the print-coverage setter 104 according to the present preferred embodiment includes an undercoat-print-coverage setter 104a and an image-print-coverage setter 104b.

The undercoat-print-coverage setter 104a corresponds to the print-coverage setter in the first and second preferred embodiments. The undercoat-print-coverage setter 104a sets, for each of the print layers, the print coverage of special color ink of the special color ink layer. The image-print-coverage setter 104b sets, for each of the print layers, the print coverage of process color ink of the process color ink layer.

FIG. 10 is a schematic view illustrating an example of an operation panel screen according to the present preferred embodiment. As illustrated in FIG. 10, the operation panel screen according to the present preferred embodiment includes an undercoat print coverage input box set Bs and an image print coverage input box set Bp. The undercoat print coverage input box set Bs is an interface that the undercoat-print-coverage setter 104a displays on the operation panel screen. The image print coverage input box set Bp is an interface that the image-print-coverage setter 104b displays on the operation panel screen. The undercoat print coverage input box set Bs includes a first undercoat print coverage input box Bs1, a second undercoat print coverage input box Bs2, and a third undercoat print coverage input box Bs3. The image print coverage input box set Bp includes a first image print coverage input boxes Bp1, a second image print coverage input box Bp2, and a third image print coverage input box Bp3.

The first undercoat print coverage input box Bs1 of the undercoat print coverage input box set Bs and the first image print coverage input box Bp1 of the image print coverage input box set Bp are used to set the print coverages for the first print layer. The first undercoat print coverage input box Bs1 is used to set the print coverage of the special color ink printed for the first print layer (which is hereinafter referred to as a "first undercoat print coverage", as appropriate). The first image print coverage input box Bp1 is used to set the print coverage of the process color inks printed for the first print layer (which is hereinafter referred to as a "first image print coverage", as appropriate). Similarly, the second undercoat print coverage input box Bs2 is used to set the print coverage of the special color ink printed for the second print layer (which is hereinafter referred to as a "second undercoat print coverage", as appropriate). The second image print coverage input box Bp2 is used to set the print coverage of the process color inks printed for the second print layer (which is hereinafter referred to as a "second image print coverage", as appropriate). The third undercoat print coverage input box Bs3 is used to set the print coverage of the special color ink printed for the third print layer (which is hereinafter referred to as a "third undercoat print coverage", as appropriate). The third image print coverage input box Bp3 is used to set the print coverage of the process color inks printed for the third print layer (which is hereinafter referred to as a "third image print coverage", as appropriate). The method of extracting ink dots based on the print coverages that have been set is the same or substantially the same as that described in the first and the second preferred embodiments.

Which of the print coverage input boxes are allowed to accept an input of print coverage is determined based on the print mode. In FIG. 10, the first multi-layer print mode is selected as the print mode. That is, a special color ink layer is provided for the first print layer, a special color ink layer is provided for the second print layer, and a process color ink layer is provided for the third print layer. In the above-described case, it is possible to input print coverages into the first undercoat print coverage input box Bs1, the second undercoat print coverage input box Bs2, the first image print coverage input box Bp1, the second image print coverage input box Bp2, and the third image print coverage input box Bp3. Because the special color ink is not ejected for the third print layer, the third undercoat print coverage input box Bs3 is disabled. In FIG. 10, the first undercoat print coverage is preferably set to about 75% and the second undercoat print coverage is preferably set to about 50%, for example. The first image print coverage is preferably set to about 20%, the second image print coverage is preferably set to about 20%, and the third image print coverage is preferably set to about 100%, for example. When the second multi-layer print mode is selected as the print mode, the print coverage input box that does not accept an input is the first undercoat print coverage input box Bs1.

Figure 11:
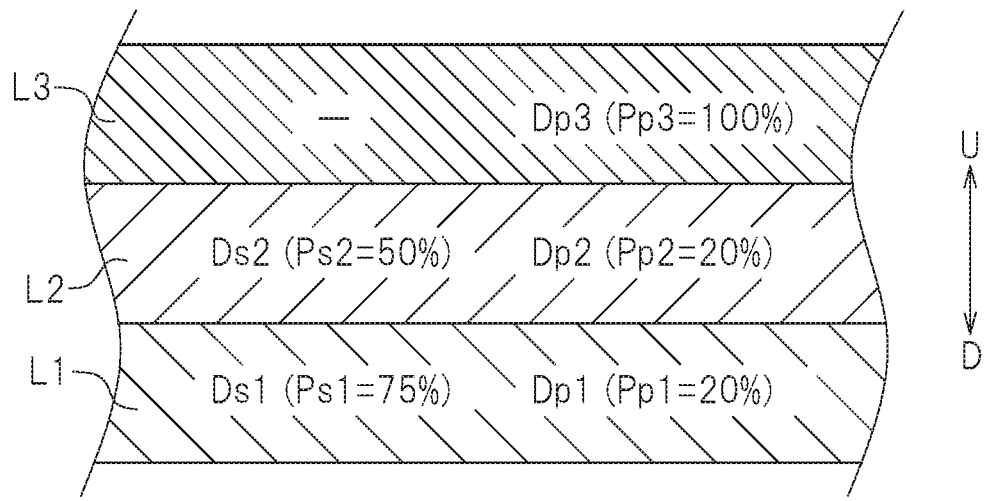
FIG. 11 is a schematic view illustrating print layers of the example illustrated in FIG. 10.

FIG. 11 is a schematic view illustrating the first to the third print layers in the case shown in FIG. 10. FIG. 11 schematically illustrates a vertical cross section of the printed recording medium 5. As illustrated in FIG. 11, the first print layer L1 includes ink dots Ds1 of the special color ink and ink dots Dp1 of the process color inks. The ink dots Ds1 of the special color ink are ink dots that are extracted based on the first undercoat print coverage Ps1=about 75%. The ink dots Dp1 of the process color inks are ink dots that are extracted based on the first image print coverage Pp1=about 20%.

As seen from above, both of the undercoat color and the image are printed lightly in the first print layer L1. The configuration of the second print layer L2 is similar to the configuration of the first print layer L1. As illustrated in FIG. 11, the second print layer L2 includes ink dots Ds2 of the special color ink and ink dots Dp2 of the process color inks. The ink dots Ds2 of the special color ink are ink dots that are extracted based on the second undercoat print coverage Ps2=about 50%. The ink dots Dp2 of the process color inks are ink dots that are extracted based on the second image print coverage Pp2=about 20%.

The third print layer L3 includes ink dots Dp3 of the process color inks. The ink dots Dp3 are based on the third image print coverage Pp3=about 100%. That is, the ink dots Dp3 are identical to the entire ink dot aggregate of the process color inks.

In the multi-layer printing shown in FIG. 11, the special color ink is ejected with a cumulative print coverage of about 125%. The process color inks are ejected with a cumulative print coverage of about 140%, and also, a portion thereof is mixed into the special color ink layer. By mixing ink dots of the process color inks into the special color ink layer in this manner, it is possible to reduce the adverse effects of the special color ink on the coloring capability of the process color inks. In the case shown in FIG. 11, it is possible to prevent the image from appearing unclear due to the adverse effects of the white ink, thus obtaining a wider color gamut in the image.

In the example shown in FIG. 11, the third image print coverage Pp3 is 100%, but it may be less than 100%, for example. The print coverage for the process color ink layer is not limited to 100%. However, it is preferable that the cumulative print coverage of process color inks be greater than or equal to 100%.

Fourth Preferred Embodiment

The fourth preferred embodiment of the present invention, enables the operator to specify the numbers and arrangements of the print layers using an operation panel screen. The printer 10 according to the fourth preferred embodiment allows the operator to specify the numbers of print layers and set whether each of the print layers is a special color ink layer or a process color ink layer. Moreover, the operator is able to set the print coverages of special color ink and process color ink in each of the print layers. The fourth preferred embodiment describes a preferred embodiment in which it is possible to specify the settings of at most five print layers, for example. It should be noted that the number of the print layers, at most five, is merely illustrative, and the number of the print layers for which the settings may be specified is not limited to five.

Figure 12:
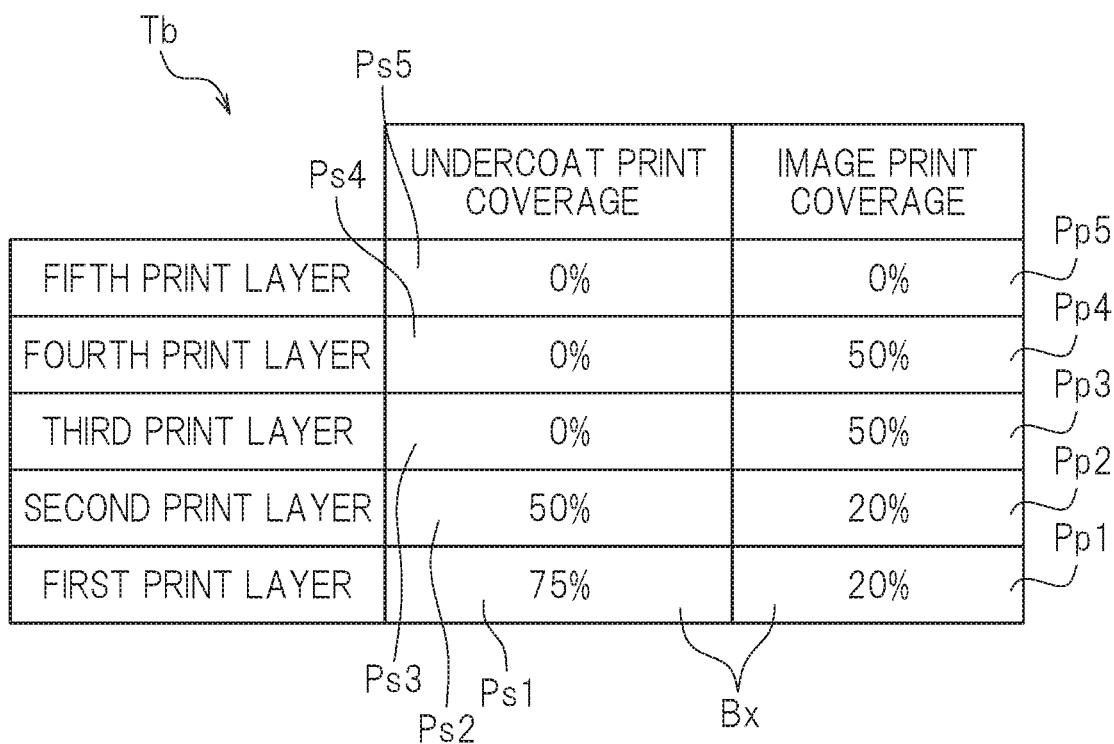
FIG. 12 is a view illustrating an example of an operation panel screen according to a fourth preferred embodiment of the present invention.

FIG. 12 is a schematic view illustrating an example of an operation panel screen according to the present preferred embodiment. As illustrated in FIG. 12, the operation panel screen according to the present preferred embodiment includes a print coverage setting table Tb. The print coverage setting table Tb is a table in which the print coverages of the special color ink and the process color inks are input for each of the print layers. The print coverage setting table Tb includes 10 input boxes Bx that correspond to five print layers, the first print layer to the fifth print layer, and two kinds of inks, special color ink and process color ink. In each of the 10 input boxes Bx, a print coverage is input. In the example shown in FIG. 12, input boxes Bx relating to the print coverages for the first print layer are preferably disposed in the bottommost row of the print coverage setting table Tb. Disposed in the row above the input boxes Bx relating to the print coverages for the first print layer are input boxes Bx relating to the print coverages for the second print layer. Similarly, disposed in the rows on top of these rows in the print coverage setting table Tb are input boxes Bx relating to the print coverages for the third print layer, the print coverages for the fourth layer, and the print coverages for the fifth layer.

Disposed in the leftmost column of the print coverage setting table Tb are input boxes Bx relating to the undercoat print coverages. Disposed in the next column to the right of the input boxes Bx relating to the undercoat print coverages are input boxes Bx relating to the image print coverages.

When the operator inputs print coverages into the print coverage setting table Tb, the operator reads the print coverage setting table Tb as a matrix. For example, an input box Bx that is the third one from the top and the second one from the left of the print coverage setting table Tb accepts an input of the image print coverage for the third print layer, i.e., an input of the third image print coverage.

Among the 10 input boxes Bx of the print coverage setting table Tb shown in FIG. 12, a print coverage of 0% is input in some of the input boxes Bx. Among them, the operator has entered 0% into the input boxes Bx relating to the print coverage for the fifth print layer, for both the fifth undercoat print coverage Ps5 and the fifth image print coverage Pp5. This means that neither of the inks is ejected for the fifth print layer. Accordingly, the printing that is set in the print coverage setting table Tb shown in FIG. 12 is four-layer overprinting.

The print coverage setting table shown in FIG. 12 shows that the operator has entered 0% for the third undercoat print coverage Ps3 and the fourth undercoat print coverage Ps4. This means that the third print layer and the fourth print layer contain only the ink dots of process color inks. Therefore, each of the third print layer and the fourth print layer is a process color ink layer. On the other hand, for the first undercoat print coverage Ps1 and the second undercoat print coverage Ps2, the operator has entered print coverages that are not 0%. Therefore, each of the first print layer and the second print layer is a special color ink layer. This shows that the print mode set in the print coverage setting table Tb of FIG. 12 is one of the four-layer stacking multi-layer print modes, or more specifically, one of the first multi-layer print modes. Among them, the print mode is the multi-layer print mode in which each of the first print layer and the second print layer is a special color ink layer and each of the third print layer and the fourth print layer is a process color ink layer. Note that both of the first print layer and the second print layer are set so that a process color ink is mixed therein. Thus, the print-coverage setter 104 according to the present preferred embodiment is able to set a print coverage of each of the inks individually for the corresponding print layer. The print mode is automatically determined from the print coverages that have been set. In the present preferred embodiment, the print mode setter 102 and the print-coverage setter 104 function integrally with each other.

Although not shown in the drawings, when the print coverages are assumed to be set as shown in FIG. 12, each of the plurality of ink heads 40 to 80 preferably includes four partial nozzle arrays, for example. Preferably, the ink head 40 ejects white ink from the nozzles 41 of the first partial nozzle array and the second partial nozzle array at print coverages of about 75% and about 50%, respectively, for example. Preferably, each of the ink heads 50 to 80 ejects process color ink from the nozzles of the first partial nozzle array at a print coverage of about 20%, from the nozzles of the second partial nozzle array at a print coverage of about 20%, from the nozzles of the third partial nozzle array at a print coverage of about 50%, and from the nozzles of the fourth partial nozzle array at a print coverage of about 50%, for example. The process of the continuous printing is analogous to the process in the preferred embodiments described above.

Thus, the printer 10 according to the present preferred embodiment allows the operator to specify the number of print layers. Moreover, it allows the operator to set whether each of the print layers is a special color ink layer or a process color ink layer. Furthermore, it allows the operator to set the print coverages of special color ink and process color ink in each of the print layers. Thus, the degree of freedom in image quality adjustment is improved by these features. For example, under the print conditions shown in FIG. 12, the print coverage of the special color ink layers is preferably set to greater than or equal to 100% to improve the light-shielding effect of white ink, and also the image produced by process color inks is overprinted to improve the clearness of the image. The printer 10 according to the present preferred embodiment makes it possible to precisely adjust the parameters that affect the print image quality.

Figure 13:
FIG. 13 is a view illustrating an example of an operation panel screen furnished with a print layer input interface.

In the fourth preferred embodiment, it is decided which of the print layers are special color ink layers and which of the print layers are process color ink layers from the print coverages that are input into the print coverage setting table Tb. However, it is also possible to directly input which of the print layers are special color ink layers and which of the print layers are process color ink layers. For example, the controller 100 may include a print layer input interface 105 provided with an interface as illustrated in FIG. 13. With the print layer input interface 105 as shown in FIG. 13, the operator should select any one of "unused", "special color ink layer", or "process color ink layer" for each of the print layers. In the example shown in FIG. 13, the selection is made by checking a check box. The operation panel screen as described above also achieves a specification similar to that of the fourth preferred embodiment.

Figure 14:
FIG. 14 is a view illustrating another example of a print coverage setting table that is different from a print coverage setting table according to the fourth preferred embodiment of the present invention.

Moreover, in the fourth preferred embodiment, four colors of process color inks are treated like one ink, and also distinguished from the special color ink. However, the print coverage setting table may be configured as shown in FIG. 14, for example (the print coverage setting table shown in FIG. 14 is denoted as a print coverage setting table Tb2). In the print coverage setting table Tb2 shown in FIG. 14, the columns correspond to ink heads, not to "undercoat print coverage" and "image print coverage" (see FIG. 12). The configuration of the print coverage setting table Tb2 enables the operator to freely change which of the ink heads should eject which ink. Moreover, if necessary, it is possible to vary the print coverages between the process color inks. When the print coverages are varied between the process color inks, the color balance of the produced image is accordingly varied. Therefore, such a specification as described above is effective, for example, to finely adjust the color balance of images.

Preferred embodiments of the present invention have been described above. It should be noted, however, that the foregoing preferred embodiments are merely exemplary and the present invention may be embodied in various other configurations.

For example, in the foregoing preferred embodiments, each of the nozzle arrays is divided into a plurality of partial nozzle arrays allocated along the sub-scanning direction X, and ink is ejected from the nozzles of the plurality of partial nozzle arrays. However, the method of ejecting ink is not limited to the above-described manner. For example, each of the nozzle arrays may not be divided into partial nozzle arrays, but the ink ejection may be divided into a plurality of times instead.

In the foregoing preferred embodiments, the print system is described as a single pass system. However, the print system may be a multi-pass system. When the technology disclosed herein is applied to the multi-pass printing, one print layer is completed by a plurality of passes.

In the foregoing preferred embodiments, two print modes are preferably included in the multi-layer print mode, for example, but the number of print modes in the multi-layer print mode is not limited to 2. For example, it is possible to set a multi-layer print mode in which two or more process color ink layers are printed and one special color ink layer is printed. The above-described print mode may preferably include the following further subdivided print modes, for example.

One of the subdivided print modes is a print mode in which the first print layer is a special color ink layer while the second print layer and the third print layer are process color ink layers. The print mode prints an image with process color inks in two overlapping layers. As a result, the print mode makes images clearer and reduces the adverse effects of the special color ink layer. The number of the print layers is not limited to three. Moreover, it is possible to provide a print mode in which the special color ink layer is printed above the process color ink layers.

Another one of the print modes is a print mode in which process color ink layers are printed above and below a special color ink layer. In other words, in this print mode, a special color ink layer is sandwiched by two process color ink layers from the top and bottom. With such printing, it is possible to print an image that is visible from both sides of the recording medium 5. Moreover, the printed image is clearer. In this print mode as well, the number of the print layers is not limited to three.

It is also possible that the inkjet printer may be able to set a print mode in which special color ink layers and process color ink layers are alternately stacked. Such a print mode is able to ensure both sufficient light shielding capability of the special color ink and sufficient clearness in printed images and is also able to obtain a more natural print finish. This print mode does not exclude stacking in which the same type of layer is stacked consecutively on one another. For example, the print mode does not exclude stacking print layers in the following order: special color ink layer—process color ink layer—process color ink layer—special color ink layer—process color ink layer.

In the foregoing preferred embodiments, the drying device that dries the ink on the recording medium 5 is preferably the heater 35 disposed below the platen 12. However, the drying device is not limited thereto. The drying device may also include, for example, a remote heating system, such as an infrared irradiation device or a halogen heater. Moreover, even when the drying device is a heater, the heater is not limited to one that heats the platen 12. Furthermore, the drying device may be provided with a pre-heater and/or a post-heater.

In the foregoing preferred embodiments, the inkjet systems used to eject ink are preferably piezo-electric systems. However, the inkjet systems of the printer according to preferred embodiments of the present invention may be selected from various types of inkjet systems, including various continuous inkjet systems, such as binary deflection inkjet system and a continuous deflection inkjet system, and various on-demand inkjet systems, such as a thermal inkjet system, for example. The inkjet system is not limited to any particular inkjet system.

In the foregoing preferred embodiments, a plurality of colors of inks are preferably ejected from different ink heads, but this is not always the case. It is possible that a single ink head may include a plurality of nozzle arrays so that the single ink head is able to eject a plurality of colors of inks. The concept of the "first ink head" and the "second ink head" disclosed herein also includes such a single ink head that includes a plurality of nozzle arrays to eject a plurality of colors of inks therefrom.

In the foregoing preferred embodiments, the carriage 25 preferably moves along the main scanning direction Y and the recording medium 5 moves along the sub-scanning direction X, but this is not necessarily required to practice preferred embodiments of the present invention. The movements of the carriage 25 and the recording medium 5 are relative, so either one of them may move along the main scanning direction Y or along the sub-scanning direction X. For example, it is possible that the recording medium 5 may be immovable while the carriage 25 may be allowed to move both along the main scanning direction Y and the sub-scanning direction X. Alternatively, it is possible that both of the carriage 25 and the recording medium 5 may move both along the main scanning direction Y and the sub-scanning direction X.

Furthermore, the technology disclosed herein may be applied to various types of inkjet printers. In addition to the roll-to-roll inkjet printers as shown in the foregoing preferred embodiments, in which a rolled recording medium 5 is delivered, the technology may also be applied to flat-bed inkjet printers, for example, in a similar manner. Moreover, the printer 10 is not limited to a printer that is to be used alone as an independent printer, but may be a printer that is combined with another apparatus. For example, the printer 10 may be incorporated in another apparatus.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms and configurations. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. An inkjet printer comprising:
   a first ink head including first nozzles arrayed along a sub-scanning direction and ejecting a special color ink onto a recording medium;
   a second ink head including second nozzles arrayed along the sub-scanning direction and ejecting a process color ink onto the recording medium; and
   a controller configured or programmed to control the first ink head and the second ink head; wherein
   the controller is configured or programmed to include:
   a converter configured or programmed to convert image data of the special color ink into ink dots of the special color ink and to convert image data of the process color ink into ink dots of the process color ink;
   a print controller configured or programmed to control at least one of the first ink head and the second ink head to print one or a plurality of print layers on the recording medium, the one or the plurality of print layers including one or both of a special color ink layer and a process color ink layer, the special color ink layer including the ink dots of the special color ink, and the process color ink layer including the ink dots of the process color ink; and
   a print mode setter configured or programmed to set a print mode and instructing the print controller to perform the print mode that has been set;
   the print mode setter is configured or programmed to set, as the print mode, a multi-layer print mode in which three or more layers including both of the special color ink layer and the process color ink layer are printed; and
   the controller is configured or programmed to include an interface that is configured or programmed to allow an operator to input a proportion of ink dots of the special color ink to be printed in each of the special color ink layers with respect to an entirety of the ink dots of the special color ink generated by the converter and a proportion of ink dots of the process color ink to be printed in each of the process color ink layers with respect to an entirety of the ink dots of the process color ink generated by the converter; and
   the special color ink is not one of the inks included in the process color ink.

2. The inkjet printer according to claim 1, wherein the multi-layer print mode includes a first print mode in which each of at least a first print layer and a second print layer is the special color ink layer, the first print layer being a bottommost layer of the plurality of print layers and the second print layer being a second bottommost layer of the plurality of print layers.

3. The inkjet printer according to claim 2, further comprising:
   a sub-scanning-direction transfer device that transfers the recording medium in the sub-scanning direction relative to the first ink head and the second ink head, wherein
   the first ink head and the second ink head are arranged side by side along a main scanning direction orthogonal or substantially orthogonal to the sub-scanning direction;
   the first ink head includes two or more special color nozzle arrays arrayed from upstream towards downstream along the sub-scanning direction, each special color nozzle array including an equal number of the first nozzles;
   the second ink head includes one or more process color nozzle arrays disposed more downstream with respect to the sub-scanning direction than the special color nozzle arrays and arrayed from upstream towards downstream along the sub-scanning direction, each of the one or more process color nozzle arrays including an equal number of the second nozzles as the number of the first nozzles of each of the special color nozzle arrays; and
   in the first print mode, the print controller is configured or programmed to control the first nozzles of the special color nozzle arrays to consecutively eject the special color ink while controlling the sub-scanning-direction transfer device to transfer the recording medium intermittently towards downstream along the sub-scanning direction so as to consecutively print the special color ink layer on the recording medium, and thereafter controls the second nozzles of the one or more process color nozzle arrays to consecutively eject the process color ink so as to consecutively print the process color ink layer over the recording medium while controlling the sub-scanning-direction transfer device to transfer the recording medium intermittently toward downstream along the sub-scanning direction.

4. The inkjet printer according to claim 1, wherein the multi-layer print mode includes a second print mode in which each of at least a topmost print layer and a second topmost print layer of the plurality of print layers is the special color ink layer.

5. The inkjet printer according to claim 1, wherein
   the multi-layer print mode includes a first print mode in which each of at least a bottommost print layer and a second bottommost print layer of the plurality of print layers is the special color ink layer, and a second print mode in which each of at least a topmost print layer and a second topmost print layer of the plurality of print layers is the special color ink layer;
   the inkjet printer further comprising a sub-scanning-direction transfer device that transfers the recording medium in the sub-scanning direction relative to the first ink head and the second ink head;

the first ink head and the second ink head are arranged side by side along a main scanning direction orthogonal or substantially orthogonal to the sub-scanning direction;

the first ink head includes an m number of special color nozzle arrays arrayed from upstream towards downstream along the sub-scanning direction, each of the special color nozzle arrays including an equal number of the first nozzles, where m is a natural number greater than or equal to 3;

the second ink head includes the m number of process color nozzle arrays, each disposed at an aligned position with the special color nozzle arrays with respect to the sub-scanning direction and each including an equal number of the second nozzles as the number of the first nozzles of each of the special color nozzle arrays;

in the first print mode, the print controller is configured or programmed to control the first nozzles belonging to a p number of the special color nozzle arrays disposed upstream with respect to the sub-scanning direction, where p is a natural number greater than or equal to 2 and less than m, to consecutively eject the special color ink while controlling the sub-scanning-direction transfer device to transfer the recording medium intermittently towards downstream along the sub-scanning direction so as to consecutively print the p number of the special color ink layers on the recording medium, and after the special color ink layers have been printed, the print controller controls the second nozzles belonging to the process color nozzle arrays disposed more downstream with respect to the sub-scanning direction than the special color nozzle arrays ejecting the special color ink so as to consecutively print a (m−p) number of the process color ink layers over the recording medium while controlling the sub-scanning-direction transfer device to transfer the recording medium intermittently toward downstream along the sub-scanning direction; and in the second print mode, the print controller is configured or programmed to control the second nozzles belonging to a q number of the process color nozzle arrays disposed upstream with respect to the sub-scanning direction, where q is a natural number less than or equal to (m−2), to consecutively eject the process color ink while controlling the sub-scanning-direction transfer device to transfer the recording medium intermittently toward downstream along the sub-scanning direction so as to consecutively print the q number of the process color ink layers on the recording medium, and after the process color ink layers have been printed, the print controller controls the first nozzles belonging to the special color nozzle arrays disposed more downstream with respect to the sub-scanning direction than the process color nozzle arrays ejecting the process color ink so as to consecutively print a (m−q) number of the special color ink layers over the recording medium while controlling the sub-scanning-direction transfer device to transfer the recording medium intermittently toward downstream along the sub-scanning direction.

6. The inkjet printer according to claim 1, wherein the interface is configured or programmed to accepts, in the multi-layer print mode, information about which of the plurality of print layers is to be a special color ink layer and which of the plurality of print layers is to be a process color ink layer in the multi-layer print mode.

7. The inkjet printer according to claim 1, wherein the controller is configured or programmed to include an image-print-coverage setter that is configured or programmed to, when an n-th print layer is the special color ink layer, extract an n-th process color ink dot group including some or all of the ink dots of the process color ink by masking all of the ink dots of the process color ink with a predetermined mask, where n is a natural number;

the print controller causes the n-th print layer to include the n-th process color dot group that is set by the image-print-coverage setter, in addition to the ink dots of the special color ink; and the interface is configured or programmed to allow the operator to input a proportion of each of the n-th process color dot group with respect to the entirety of the ink dots of the process color ink generated by the converter.

8. The inkjet printer according to claim 1, further comprising a dryer that dries the special color ink and the process color ink ejected on the recording medium.

9. The inkjet printer according to claim 1, wherein a total of the proportion of the ink dots of the special color ink to be printed in each of the special color ink layers is 100% or more with respect to the entirety of the ink dots of the special color ink generated by the converter.

10. The inkjet printer according to claim 1, wherein a total of the proportion of the ink dots of the process color ink to be printed in each of the process color ink layers is 100% or more with respect to the entirety of the ink dots of the process color ink generated by the converter.

11. The inkjet printer according to claim 1, wherein a number of the process color ink layers is two or more.

12. The inkjet printer according to claim 11, wherein one or more of the special color ink layers is sandwiched by two of the process color ink layers.

13. An inkjet printer comprising:
a first ink head including first nozzles arrayed along a sub-scanning direction and ejecting a special color ink onto a recording medium;
a second ink head including second nozzles arrayed along the sub-scanning direction and ejecting a process color ink onto the recording medium; and
a controller configured or programmed to control the first ink head and the second ink head; wherein
the controller is configured or programmed to include:
a converter configured or programmed to convert image data of the special color ink into ink dots of the special color ink and to convert image data of the process color ink into ink dots of the process color ink;
a print controller configured or programmed to control at least one of the first ink head and the second ink head to print one or a plurality of print layers on the recording medium, the one or the plurality of print layers including one or both of a special color ink layer and a process color ink layer, the special color ink layer including the ink dots of the special color ink, and the process color ink layer including the ink dots of the process color ink; and
a print mode setter configured or programmed to set a print mode and instructing the print controller to perform the print mode that has been set;
the print mode setter is configured or programmed to set, as the print mode, a multi-layer print mode in which three or more layers including both of the special color ink layer and the process color ink layer are printed; and the controller is configured or programmed to include an interface that is configured or programmed to allow an operator to input a proportion of ink dots of the special color ink to be printed in each of the special color ink layers with respect to an entirety of the ink dots of the special color ink generated by the converter and a proportion of ink dots of the process color ink to be printed in each of the process color ink layers with respect to an entirety of the ink dots of the process color ink generated by the converter; and the special color ink is a white ink.

* * * * *

UNITED STATES PATENT AND TRADEMARK OFFICE
CERTIFICATE OF CORRECTION

PATENT NO. : 10,609,258 B2  
APPLICATION NO. : 15/959380  
DATED : March 31, 2020  
INVENTOR(S) : Yoshinari Ogura Page 1 of 1

It is certified that error appears in the above-identified patent and that said Letters Patent is hereby corrected as shown below:

In the Claims

In Line 35 of Column 27, Claim 5:
"color ink so as to consecutively print a (m p) number of"
Should be corrected as follows:
--color ink so as to consecutively print (m-p) number of--

In Line 63 of Column 27, Claim 6:
"interface is configured or programmed to accepts, in the"
Should be corrected as follows:
--interface is configured or programmed to accept, in the--

Signed and Sealed this  
First Day of September, 2020

Andrei Iancu  
*Director of the United States Patent and Trademark Office*